US010718119B2

(12) United States Patent
Telleria et al.

(10) Patent No.: US 10,718,119 B2
(45) Date of Patent: Jul. 21, 2020

(54) AUTOMATED DRYWALL SANDING SYSTEM AND METHOD

(71) Applicant: Canvas Construction, Inc., San Francisco, CA (US)

(72) Inventors: Maria J. Telleria, Redwood City, CA (US); Gabriel F. Hein, Albany, CA (US); Kevin B. Albert, San Francisco, CA (US); Thomas F. Allen, Oakland, CA (US); Henrik Bennetsen, San Francisco, CA (US); Josephine Marie Pedersen, Martinez, CA (US); Jonathan B. Pompa, Long Beach, CA (US); Charlie Yan, San Francisco, CA (US); Alana G. R. Yoel, San Francisco, CA (US); Miles J. Flannery, San Francisco, CA (US); Henry Tonoyan, San Francisco, CA (US)

(73) Assignee: CANVAS CONSTRUCTION, INC., San Francisco, CA (US)

( * ) Notice: Subject to any disclaimer, the term of this patent is extended or adjusted under 35 U.S.C. 154(b) by 33 days.

(21) Appl. No.: 15/942,318

(22) Filed: Mar. 30, 2018

(65) Prior Publication Data
US 2018/0281143 A1 Oct. 4, 2018

Related U.S. Application Data

(60) Provisional application No. 62/480,172, filed on Mar. 31, 2017.

(51) Int. Cl.
*E04F 21/02* (2006.01)
*E04F 21/165* (2006.01)
(Continued)

(52) U.S. Cl.
CPC .............. *E04F 21/026* (2013.01); *B05B 1/28* (2013.01); *B05B 7/0093* (2013.01); *B05B 9/007* (2013.01);
(Continued)

(58) Field of Classification Search
None
See application file for complete search history.

(56) References Cited

U.S. PATENT DOCUMENTS

| | | | |
|---|---|---|---|
| 2,088,542 A | 7/1937 | Westin | |
| 2,514,748 A | 7/1950 | Di Stefano | |

(Continued)

FOREIGN PATENT DOCUMENTS

| | | | |
|---|---|---|---|
| CN | 2883554 Y | 3/2007 | |
| CN | 202023345 U | 11/2011 | |

(Continued)

OTHER PUBLICATIONS

Nagata "Robotic sanding system for new designed furniture with free-formed surface", 2007, Robotics and Computer-Integrated Manufacturing 23 (2007), pp. 371-379 (Year: 2007).*

(Continued)

*Primary Examiner* — Mohammad Ali
*Assistant Examiner* — David Earl Ogg
(74) *Attorney, Agent, or Firm* — Davis Wright Tremaine LLP

(57) ABSTRACT

An automated sanding system that includes a robotic arm and a sanding end effector coupled at the distal end of the robotic arm, with the sanding end effector configured to sand a target surface. The system can further include a computing device executing a computational planner that generates instructions for driving the sanding end effector and robotic arm to perform at least one sanding task that at least includes the sanding end effector sanding a target surface, the gen- (Continued)

erating based at least in part on obtained target surface data; and drives the end effector and robotic arm to perform the at least one sanding task.

20 Claims, 20 Drawing Sheets

(51) Int. Cl.
| | |
|---|---|
| E04F 21/18 | (2006.01) |
| E04F 21/12 | (2006.01) |
| B05B 1/28 | (2006.01) |
| B05B 7/00 | (2006.01) |
| B05B 15/625 | (2018.01) |
| B05B 12/12 | (2006.01) |
| B05B 9/00 | (2006.01) |
| B25J 9/16 | (2006.01) |
| B25J 11/00 | (2006.01) |
| B26D 5/00 | (2006.01) |
| E04F 21/08 | (2006.01) |
| E04F 21/16 | (2006.01) |
| B24B 7/18 | (2006.01) |
| B24B 49/12 | (2006.01) |
| B24B 55/10 | (2006.01) |
| E04F 21/00 | (2006.01) |
| B05C 5/00 | (2006.01) |
| B05C 5/02 | (2006.01) |
| B05C 11/10 | (2006.01) |
| B05D 1/02 | (2006.01) |
| B05D 3/04 | (2006.01) |
| B05D 3/06 | (2006.01) |
| B24B 55/06 | (2006.01) |
| B25J 15/00 | (2006.01) |
| E04B 1/76 | (2006.01) |
| B05B 7/26 | (2006.01) |
| B05C 3/18 | (2006.01) |
| B05B 14/00 | (2018.01) |
| B05B 7/24 | (2006.01) |
| B05B 9/01 | (2006.01) |
| B25J 9/00 | (2006.01) |
| B26D 3/08 | (2006.01) |

(52) U.S. Cl.
CPC .......... *B05B 12/122* (2013.01); *B05B 15/625* (2018.02); *B05C 5/004* (2013.01); *B05C 5/02* (2013.01); *B05C 11/1039* (2013.01); *B05D 1/02* (2013.01); *B05D 3/0413* (2013.01); *B05D 3/067* (2013.01); *B24B 7/182* (2013.01); *B24B 49/12* (2013.01); *B24B 55/06* (2013.01); *B24B 55/10* (2013.01); *B25J 9/1661* (2013.01); *B25J 9/1697* (2013.01); *B25J 11/0055* (2013.01); *B25J 11/0075* (2013.01); *B25J 15/0019* (2013.01); *B26D 5/007* (2013.01); *E04B 1/7654* (2013.01); *E04F 21/0046* (2013.01); *E04F 21/08* (2013.01); *E04F 21/085* (2013.01); *E04F 21/12* (2013.01); *E04F 21/16* (2013.01); *E04F 21/165* (2013.01); *E04F 21/1652* (2013.01); *E04F 21/1657* (2013.01); *E04F 21/18* (2013.01); *B05B 7/24* (2013.01); *B05B 7/26* (2013.01); *B05B 9/01* (2013.01); *B05B 14/00* (2018.02); *B05C 3/18* (2013.01); *B25J 9/0084* (2013.01); *B26D 3/085* (2013.01); *G05B 2219/40298* (2013.01); *Y10S 901/01* (2013.01); *Y10S 901/41* (2013.01); *Y10S 901/43* (2013.01); *Y10S 901/47* (2013.01)

(56) References Cited

U.S. PATENT DOCUMENTS

| | | | |
|---|---|---|---|
| 3,116,882 | A | 1/1964 | Vork |
| 4,941,182 | A | 7/1990 | Patel |
| 5,175,018 | A | 12/1992 | Lee et al. |
| 5,279,700 | A * | 1/1994 | Retti ............... E04F 21/165 |
| | | | 118/679 |
| 5,670,202 | A | 9/1997 | Guzowski et al. |
| 5,979,520 | A | 11/1999 | Behrendt |
| 6,112,490 | A | 9/2000 | Meyer |
| 6,149,506 | A * | 11/2000 | Duescher ............. B24B 1/00 |
| | | | 451/178 |
| 6,712,238 | B1 | 3/2004 | Mills |
| 7,551,058 | B1 | 6/2009 | Johnson et al. |
| 9,518,870 | B2 | 12/2016 | Verdino |
| 9,527,211 | B2 | 12/2016 | Posselius et al. |
| 9,694,381 | B2 * | 7/2017 | Mohr ............... B05C 17/00589 |
| 9,702,830 | B1 | 7/2017 | Akselrod et al. |
| 9,849,594 | B2 | 12/2017 | Keese |
| 9,995,047 | B2 * | 6/2018 | Raman ............... E04F 21/1872 |
| 2004/0159724 | A1 | 8/2004 | van der Steur |
| 2005/0120840 | A1 | 6/2005 | Koskovich |
| 2006/0108450 | A1 | 5/2006 | Klinkenberg et al. |
| 2007/0000947 | A1 | 1/2007 | Lewis et al. |
| 2007/0107632 | A1 | 5/2007 | Ball |
| 2007/0151201 | A1 | 7/2007 | Fellinger |
| 2009/0199690 | A1 | 8/2009 | Sun et al. |
| 2010/0010660 | A1 | 1/2010 | Salour et al. |
| 2011/0011222 | A1 | 1/2011 | Bales |
| 2011/0211938 | A1 | 9/2011 | Eakins et al. |
| 2011/0253291 | A1 | 10/2011 | Allen et al. |
| 2012/0219699 | A1 | 8/2012 | Pettersson et al. |
| 2013/0167471 | A1 | 7/2013 | Denaro |
| 2014/0022281 | A1 | 1/2014 | Georgeson et al. |
| 2014/0230726 | A1 | 8/2014 | Gale et al. |
| 2015/0112482 | A1 | 4/2015 | Kuwahara |
| 2015/0147460 | A1 | 5/2015 | Manzi et al. |
| 2015/0336267 | A1 | 11/2015 | Sun et al. |
| 2015/0350618 | A1 | 12/2015 | Meier et al. |
| 2016/0052012 | A1 | 2/2016 | Mohr |
| 2016/0121486 | A1 * | 5/2016 | Lipinski ............... B05B 13/005 |
| | | | 427/427.3 |
| 2016/0313294 | A1 | 10/2016 | Dattilo et al. |
| 2017/0052507 | A1 | 2/2017 | Poulos et al. |
| 2018/0009000 | A1 | 1/2018 | Shang et al. |
| 2018/0021799 | A1 | 1/2018 | Raman et al. |
| 2019/0118209 | A1 | 4/2019 | Rennuit |

FOREIGN PATENT DOCUMENTS

| | | | | |
|---|---|---|---|---|
| CN | 105971253 | A | 9/2016 | |
| CN | 106088544 | A | 11/2016 | |
| DE | 102006056179 | A1 * | 6/2008 | ............ B24B 27/04 |
| JP | H03100265 | A | 4/1991 | |
| JP | H04169659 | A | 6/1992 | |
| JP | H10180178 | A | 7/1998 | |
| RU | 1789711 | C | 1/1993 | |
| RU | 2100686 | C1 | 12/1997 | |
| SU | 00160667 | | 11/1963 | |
| WO | 2013000524 | A1 | 1/2013 | |
| WO | 2016200439 | A1 | 12/2016 | |
| WO | 2018183961 | A1 | 10/2018 | |
| WO | 2018226533 | A1 | 12/2018 | |

OTHER PUBLICATIONS

Bao et al., "Flexible Pneumatic End-effector for Agricultural Robot: Design & Experiment," Proceedings of the 2015 IEEE Conference on Robotics and Biomimetics, Dec. 6, 2015, 6 pages.

FANUC America Corporation, "Robotic Sanding, Washing & Drying An Aircraft Fuselage with FANUC's New P-350iA/45 Robot," Oct. 27, 2018, retrieved from https://www.youtube.com/watch?v=abA9v8EOokl, 4 pages.

(56) References Cited

OTHER PUBLICATIONS

International Search Report and Written Opinion dated Feb. 28, 2019, International Patent Application No. PCT/US2018/052751, filed Sep. 25, 2018, 7 pages.
Krieg, "HygroSkin—Meteorosensitive Pavilion," Fabricate 2014: Negotiating Design and Making, Feb. 2014, https://www.researchgate.net/publication/273060832_HygroSkin_-_Meteorosensitive_Pavilion, 9 pages.
International Search Report and Written Opinion dated Aug. 2, 2018, International Patent Application No. PCT/US2018/025570, filed Mar. 30, 2018, 7 pages.
International Search Report and Written Opinion dated Jul. 5, 2018, International Patent Application No. PCT/US2018/025529, filed Mar. 30, 2018, 7 pages.
International Search Report and Written Opinion dated Jul. 5, 2018, International Patent Application No. PCT/US2018/025536, filed Mar. 30, 2018, 7 pages.
International Search Report and Written Opinion dated Jul. 5, 2018, International Patent Application No. PCT/US2018/025553, filed Mar. 30, 2018, 7 pages.
International Search Report and Written Opinion dated Jul. 5, 2018, International Patent Application No. PCT/US2018/025556, filed Mar. 30, 2018, 7 pages.
International Search Report and Written Opinion dated Jul. 5, 2018, International Patent Application No. PCT/US2018/025566, filed Mar. 30, 2018, 7 pages.
FANUC America Corporation, "Robotic Sanding, Washing & Drying an Aircraft Fuselage with Fanuc's New P-350iA/45 Robot," Oct. 27, 2016, retrieved from https://www.youtube.com/watch?v=abA9v8EOokl, 4 pages.
Forsberg et al., "A Construction Robot for Autonomous Plastering of Walls and Ceilings," Jun. 11, 1997, retrieved Aug. 8, 2019, from http://www.iaarc.org/publications/fulltext/A_construction_robot_for_autonomous_plastering_of_walls_and_ceilings.PDF, 9 pages.
Tuberville Enterprizes, "Walls & Ceilings Joint Compund Additive," Jun. 5, 2012, retrieved Aug. 8, 2019, from https://www.wconline.com/articles/88003-joint-compound-additive, 1 page.
International Search Report and Written Opinion dated May 28, 2020, in International Patent Application No. 3CT/US2020/019347, filed Feb. 21, 2020, 9 pages.

\* cited by examiner

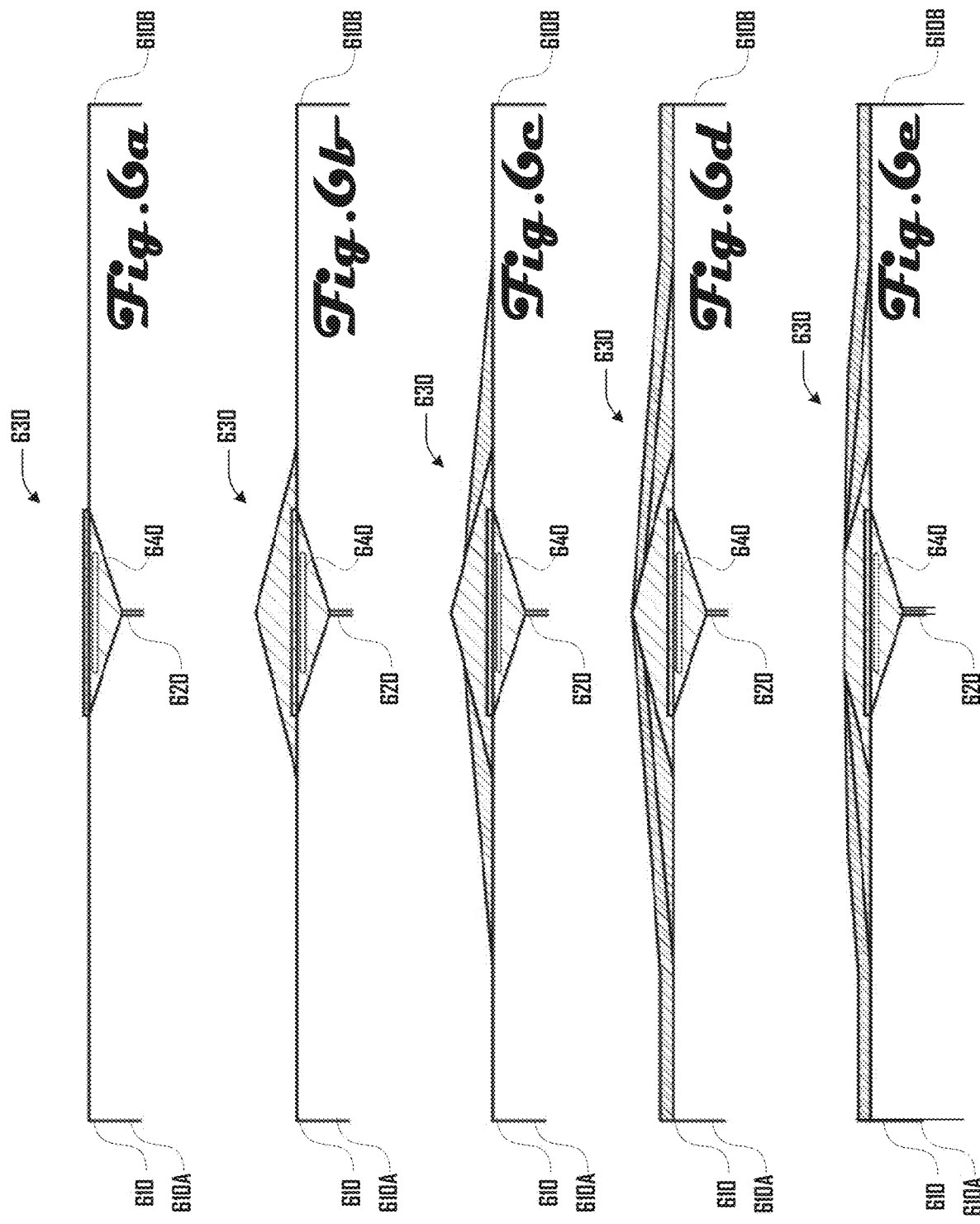

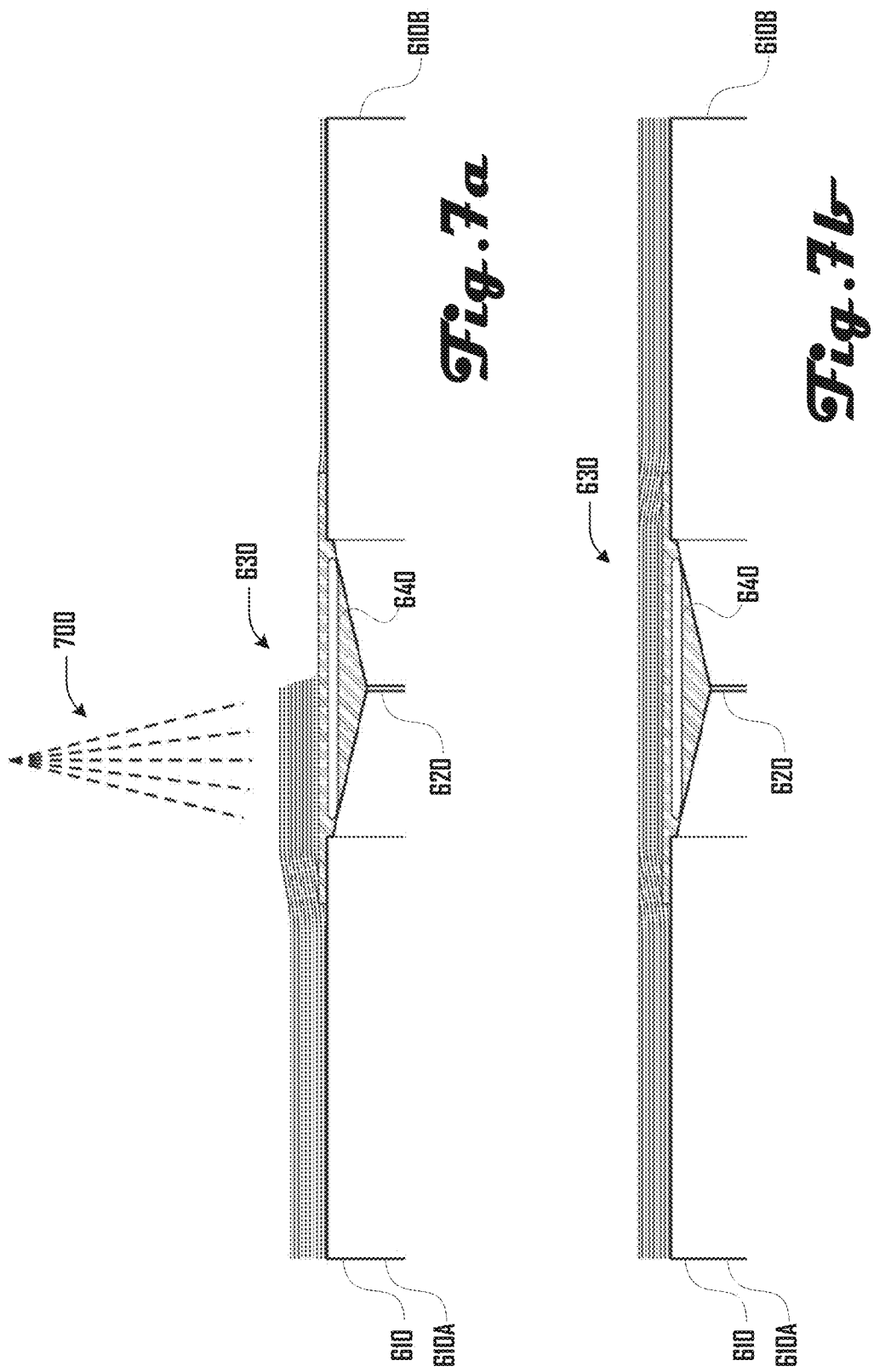

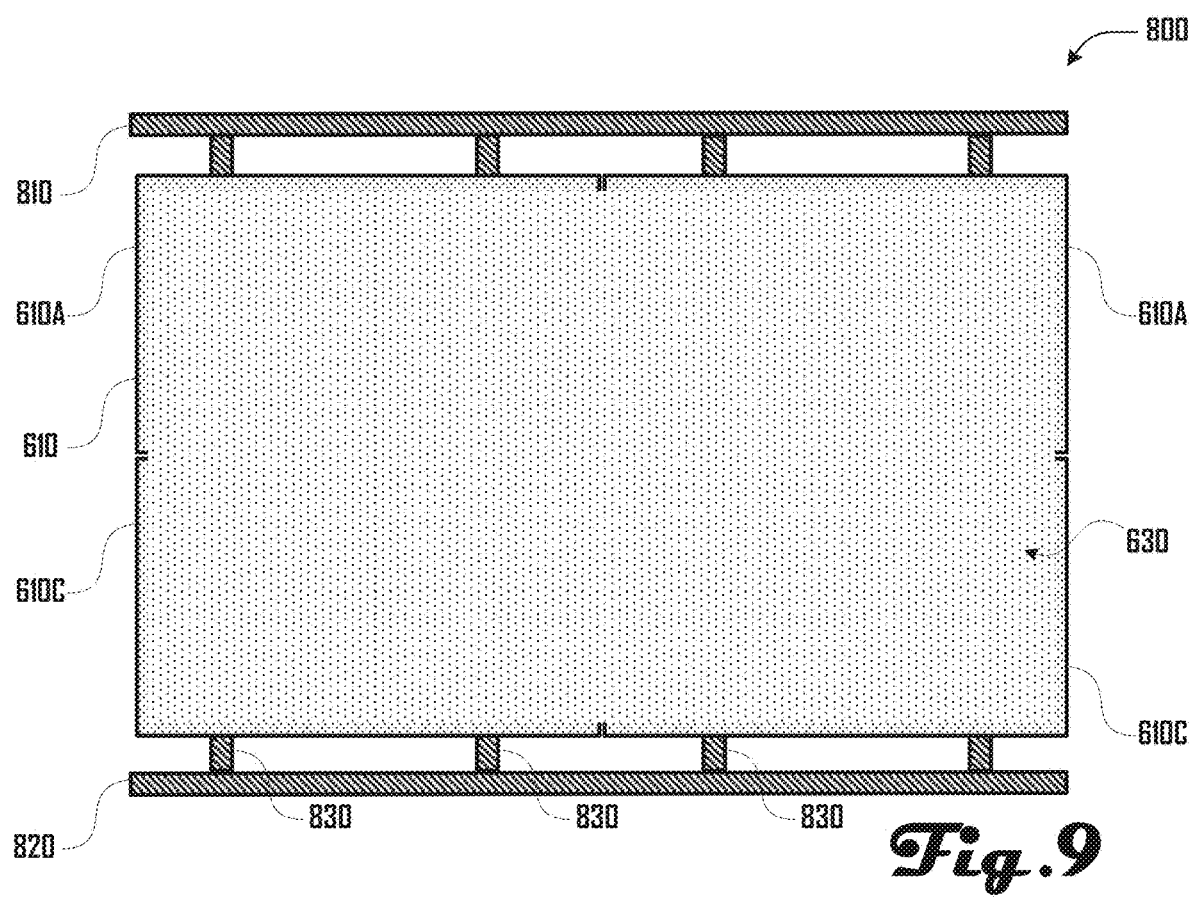

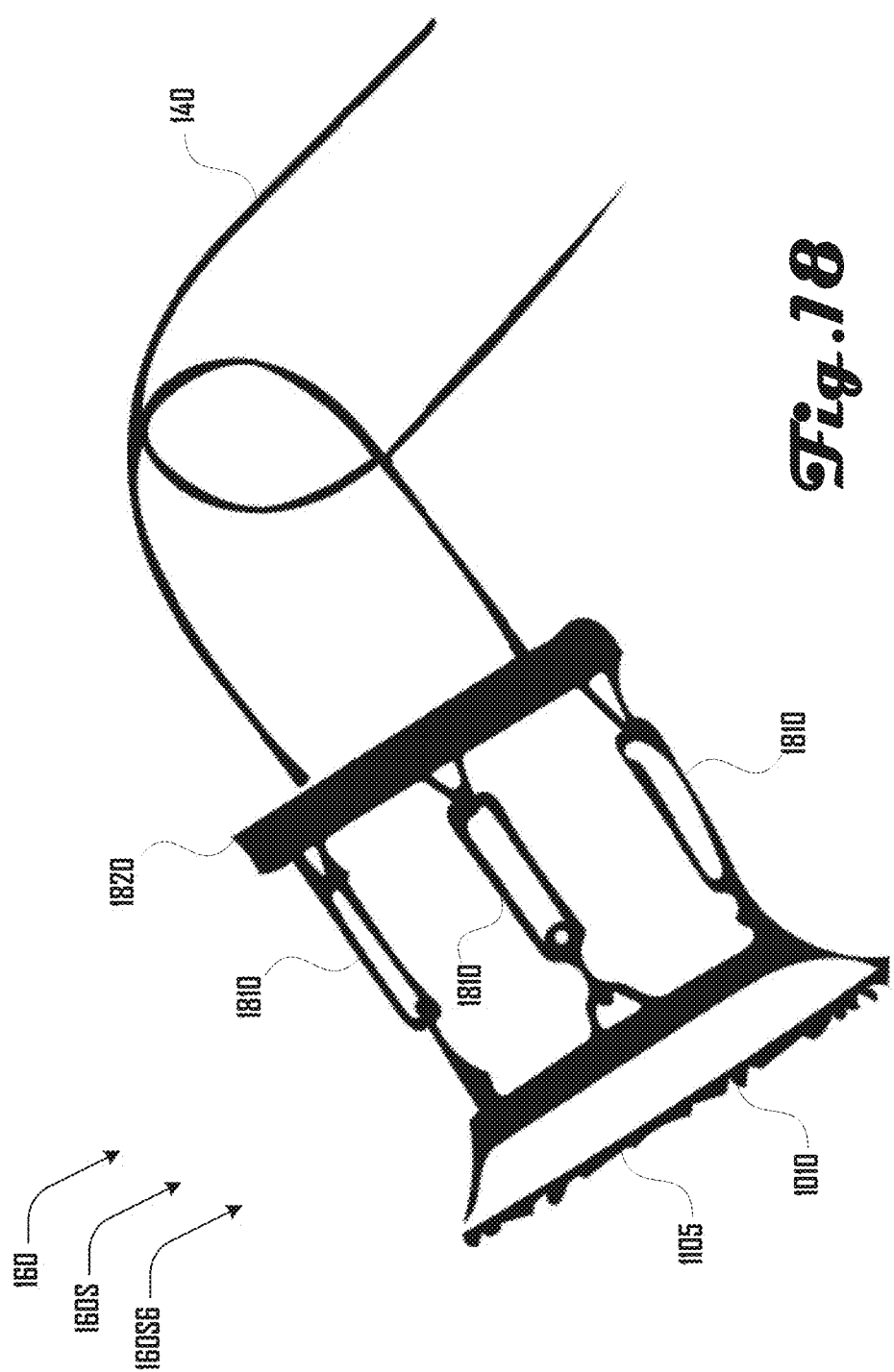

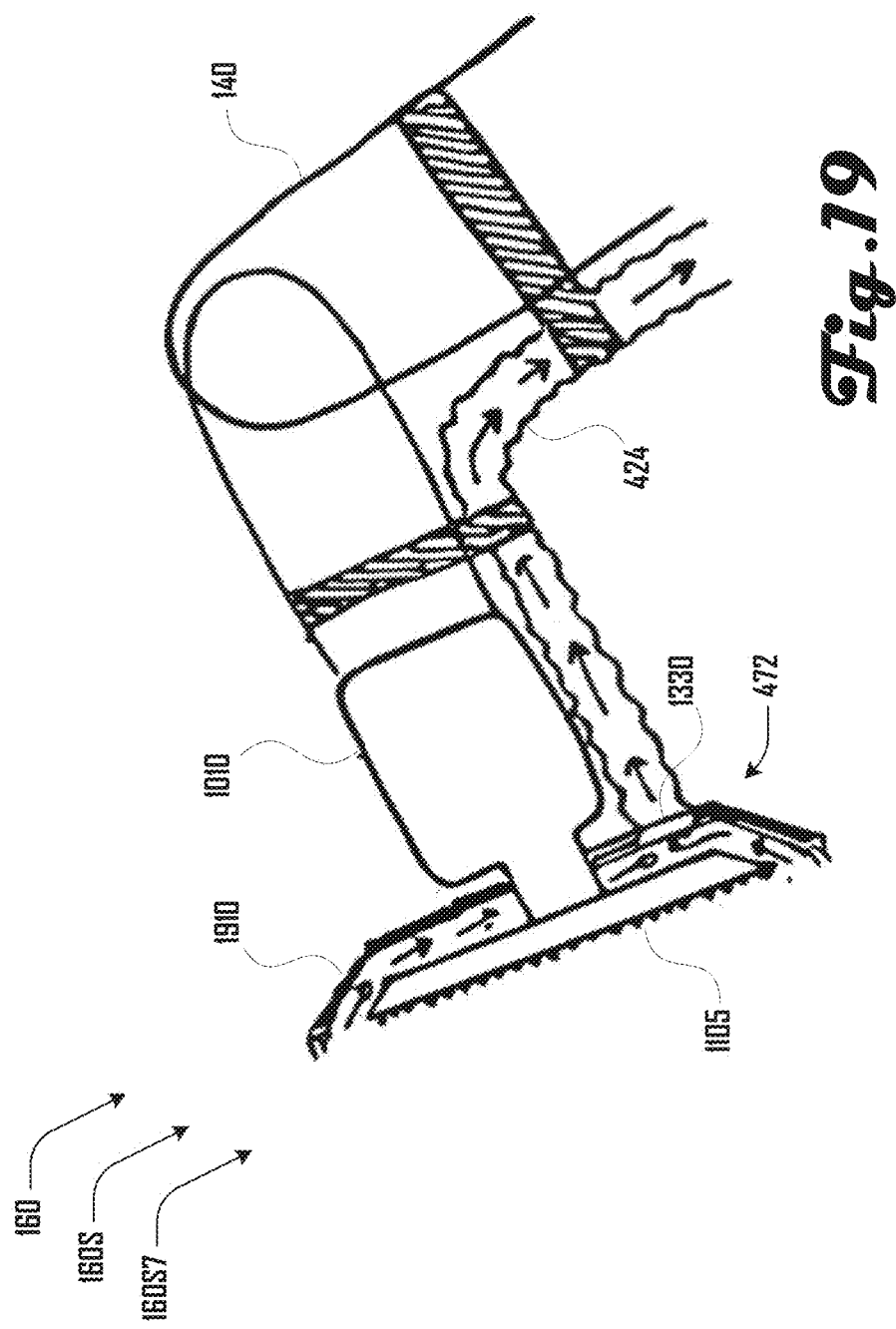

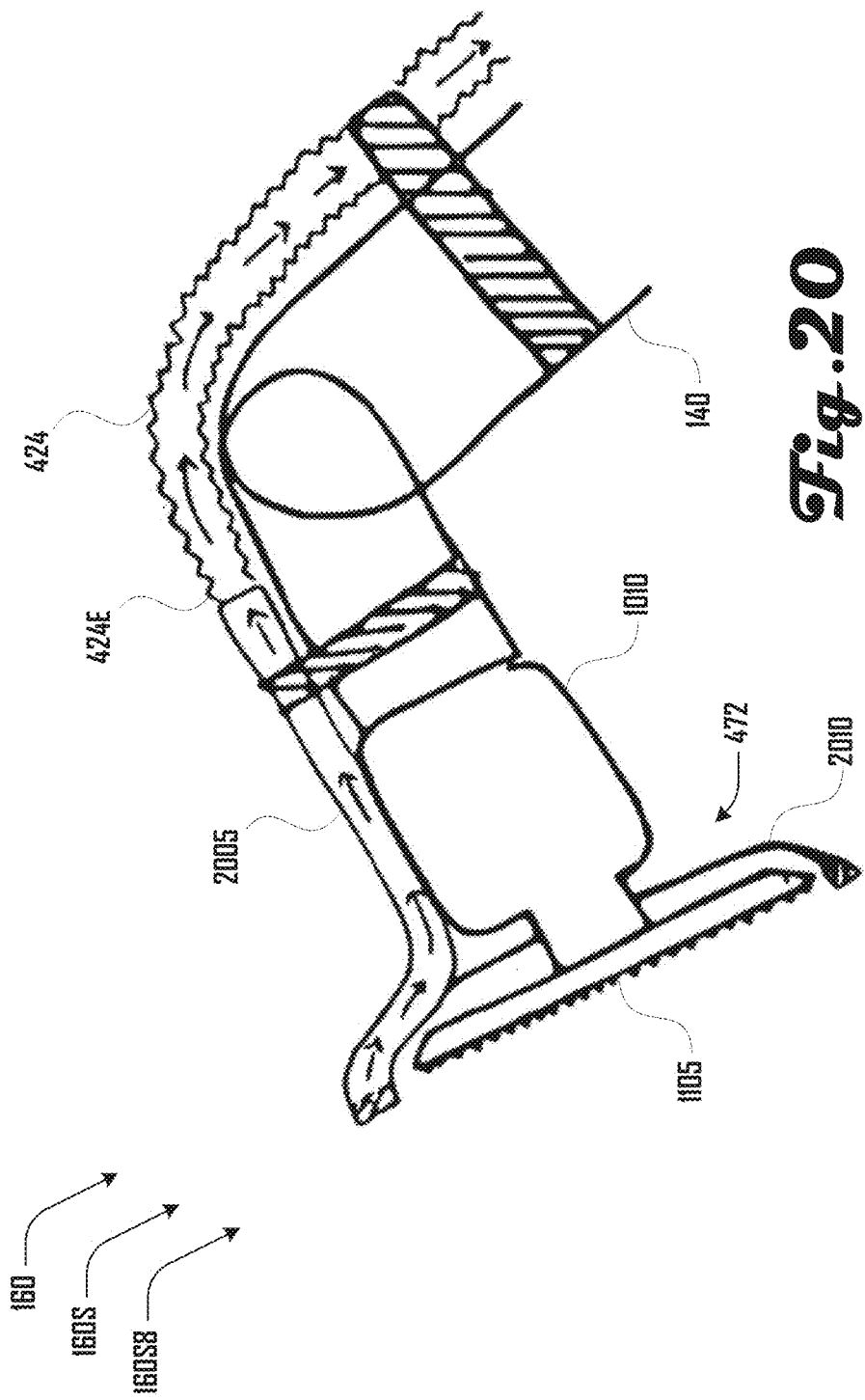

AUTOMATED DRYWALL SANDING SYSTEM AND METHOD

CROSS-REFERENCE TO RELATED APPLICATIONS

This application is a non-provisional of, and claims the benefit of U.S. Provisional Application No. 62/480,172, filed Mar. 31, 2017, which application is hereby incorporated herein by reference in its entirety and for all purposes.

This application is also related to U.S. Non-provisional applications, having respective application Ser. Nos. 15/942,158, 15/942,193, 15/941,886, 15/942,087, 15/942,286 and 15/941,974 and respectively entitled "AUTOMATED DRYWALL PLANNING SYSTEM AND METHOD," "AUTOMATED DRYWALL CUTTING AND HANGING SYSTEM AND METHOD," "AUTOMATED DRYWALL MUDDING SYSTEM AND METHOD," "AUTOMATED DRYWALL PAINTING SYSTEM AND METHOD," "AUTOMATED DRYWALLING SYSTEM AND METHOD," and "AUTOMATED INSULATION APPLICATION SYSTEM AND METHOD." These applications are hereby incorporated herein by reference in their entirety and for all purposes.

BRIEF DESCRIPTION OF THE DRAWINGS

FIGS. 6a, 6b, 6c, 6d and 6e illustrate an embodiment of a manual mud application profile, where joint compound is applied over consecutive layers to taper out high points over a wider area and where sanding is then used to smooth out the final profile.

FIGS. 7a and 7b illustrate an embodiment of an automated compound application process where the joint compound is applied in a thick layer using a sprayer.

FIGS. 8a, 8b and 9 illustrate a series of steps in an example method of installing drywall to generate a wall assembly.

FIG. 18 illustrates a further embodiment of a sanding end effector where the sanding head is mounted in series with one or more linear actuators that are used to control tip and tilt of the sanding head relative to a target surface and/or the normal position and applied force of the sanding head.

FIG. 19 illustrates one example embodiment of a sanding end effector that includes a vacuum system with a vacuum hood surrounding a sanding head.

FIG. 20 illustrates a further embodiment of a sanding end effector having a vacuum system where the sanding head is trailed by a vacuum nozzle.

Figure 1:
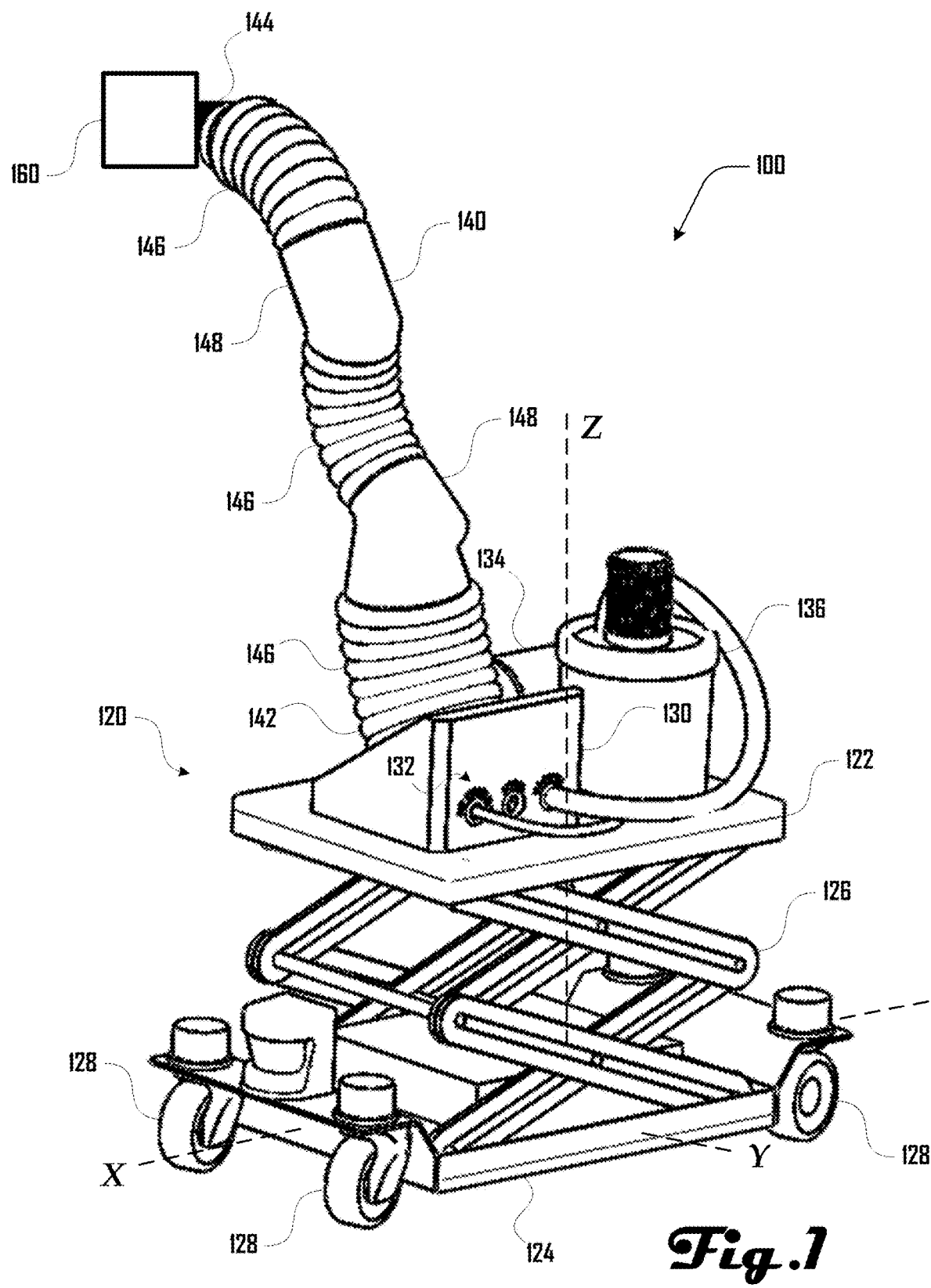
FIG. 1 is an exemplary perspective drawing illustrating an embodiment of an automated drywall installation system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

The following disclosure pertains to an automated drywalling system, which in some embodiments can be used for drywalling, including one or more of planning a configuration and location of drywall pieces on a wall assembly, cutting drywall pieces, hanging drywall pieces, performing mud work on hung drywall pieces, performing sanding on mudded drywall pieces and painting sanded drywall pieces.

One aspect relates to an automated drywalling system that can utilize a powered or unpowered sander to smooth or remove joint compound or other materials such as plaster or the like. The sander can be a rotary sander, an orbital sander, a belt sander, a random-orbit sander, detail sander, oscillating edge, spindle sander, drum sander, finishing sander, or the like.

Figure 2:
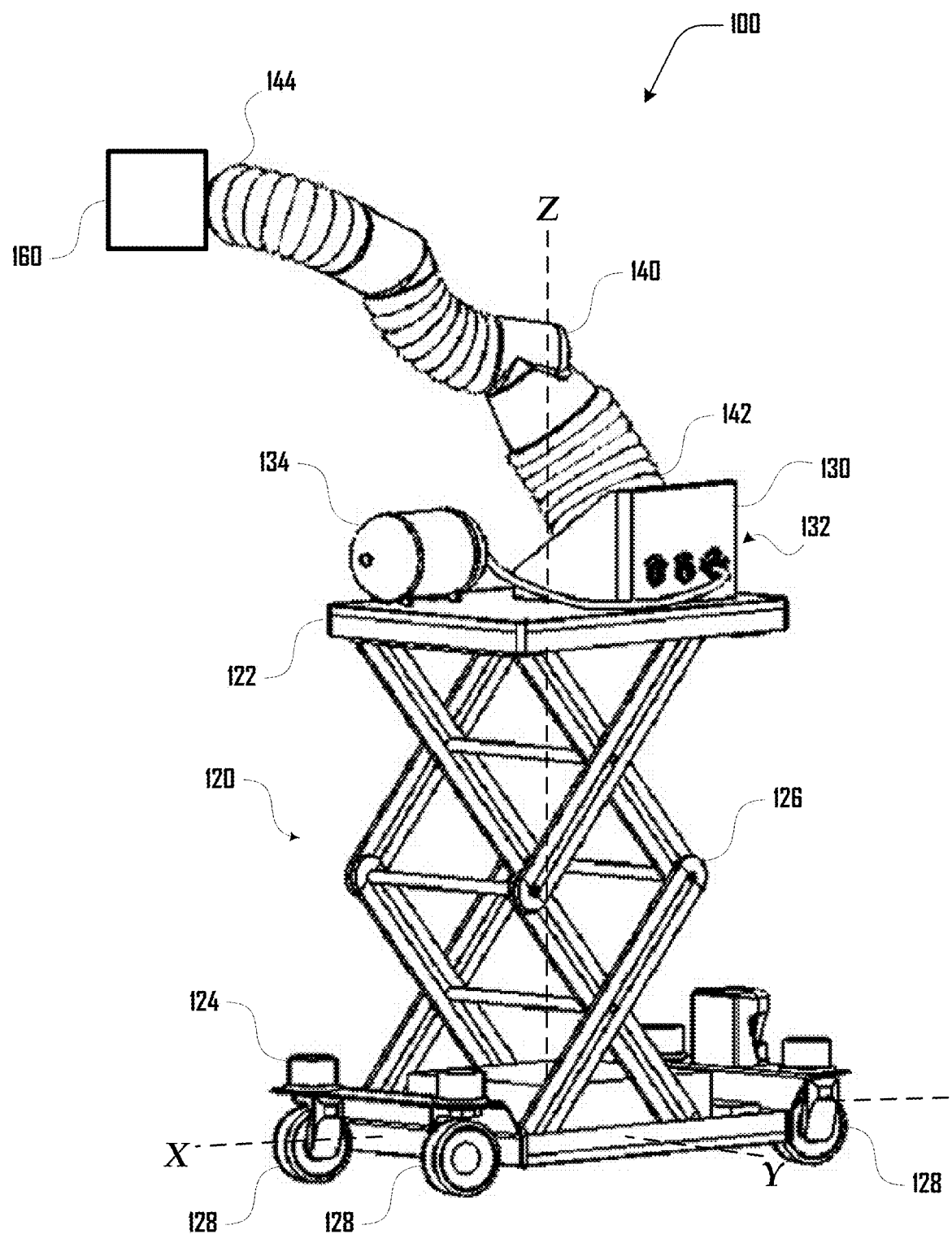
FIG. 2 is an exemplary perspective drawing illustrating another embodiment of an automated drywalling system.

Turning to FIGS. 1 and 2, examples of an automated drywalling system 100 are illustrated, which includes a base unit 120, a robotic arm 140 and an end effector 160. The base unit 120 comprises a platform 122 and a cart 124 with a lift 126 disposed between the platform 122 and cart 124. The cart 124 can be configured to be disposed on the ground and move within an XY plane defined by axes X and Y, and the lift 126 can be configured to raise the platform 122 up and down along axis Z, which is perpendicular to axes X and Y.

In the examples of FIGS. 1 and 2, the cart 124 can comprise a plurality of wheels 128, which can be used to move the cart 124 and drywalling system 100 on the ground in the XY plane. Such movement can be motorized or can be non-motorized. For example, in some embodiments, the drywalling system 100 can be configured for automated movement of the cart 124, motorized movement based on input from a user and/or non-motorized movement based on physical movement by a user. Additionally, while an example having wheels 128 is shown in some examples herein, it should be clear that the cart 124 can be configured for motorized and/or non-motorized movement via any suitable structures, systems, or the like.

In the examples of FIGS. 1 and 2, the lift 126 is shown comprising a scissor lift that can raise and lower the platform 122 relative to the cart 124 along axis Z. Such movement can be motorized or can be non-motorized. For example, in some embodiments, the drywalling system 100 can be configured for automated movement of the lift 126, motorized movement of the lift 126 based on input from a user and/or non-motorized movement based on physical operation of the lift 126 by a user. Additionally, while an example of a scissor lift is shown herein, it should be clear that any suitable lift system can comprise the lift 126 without limitation.

The platform 122 can comprise a hub 130, which can couple with the robotic arm 140 at a base end 142 of the robotic arm 140. The hub 130 can comprise an input interface 132 that allows for various systems to couple with the hub 130, which can allow for resources provided by such systems to be provided to the robotic arm 140 and/or the end effector 160 coupled at a distal end 144 of the robotic arm 140 as discussed in more detail herein. For example, a pneumatic source, a power source, a vacuum source, a paint source, a mud or joint compound source, or the like can be coupled to the hub 130. FIG. 1 illustrates an example having an air compressor 134 and a vacuum source 136 coupled to the hub 130. FIG. 2 illustrates an example having an air compressor 134 coupled to the hub 130, which can be used to power pneumatic actuators 146 of the robotic arm 140 and/or provide compressed air to the end effector 160 at the distal end 144 of the robotic arm 140.

In various embodiments, the robotic arm 140 can comprise any suitable robotic arm system, which can include pneumatic actuators, electric actuators, and the like. The robotic arm 140 can have any suitable number of degrees of freedom. Although the examples of FIGS. 1 and 2 illustrate an example having pneumatic actuator units 146 separated by arm couplers 148, this example configuration should not be construed to be limiting on the wide variety of robotic arms 140 that are within the scope and spirit of the present disclosure.

As discussed in more detail herein, an end effector 160 can be coupled at the distal end 144 of the robotic arm 140. In some examples, the automated drywalling system 100 can comprise modular and/or multi-use end effectors 160, which can be configured for various drywalling, construction, or other tasks. For example, as discussed herein, end effectors 160 can be configured for drywall planning, drywall hanging, applying mud or joint compound to hung drywall, sanding mudded drywall, painting, and the like. Although various examples herein relate to drywalling and construction, further embodiments of the drywalling system 100 can be configured for any suitable tasks, including construction tasks, manufacturing tasks, gardening tasks, farming tasks, domestic tasks, and the like. Accordingly, the discussions herein related to drywalling and construction should not be construed to be limiting on the wide variety of tasks that the system 100 can be configured for.

Figure 3:
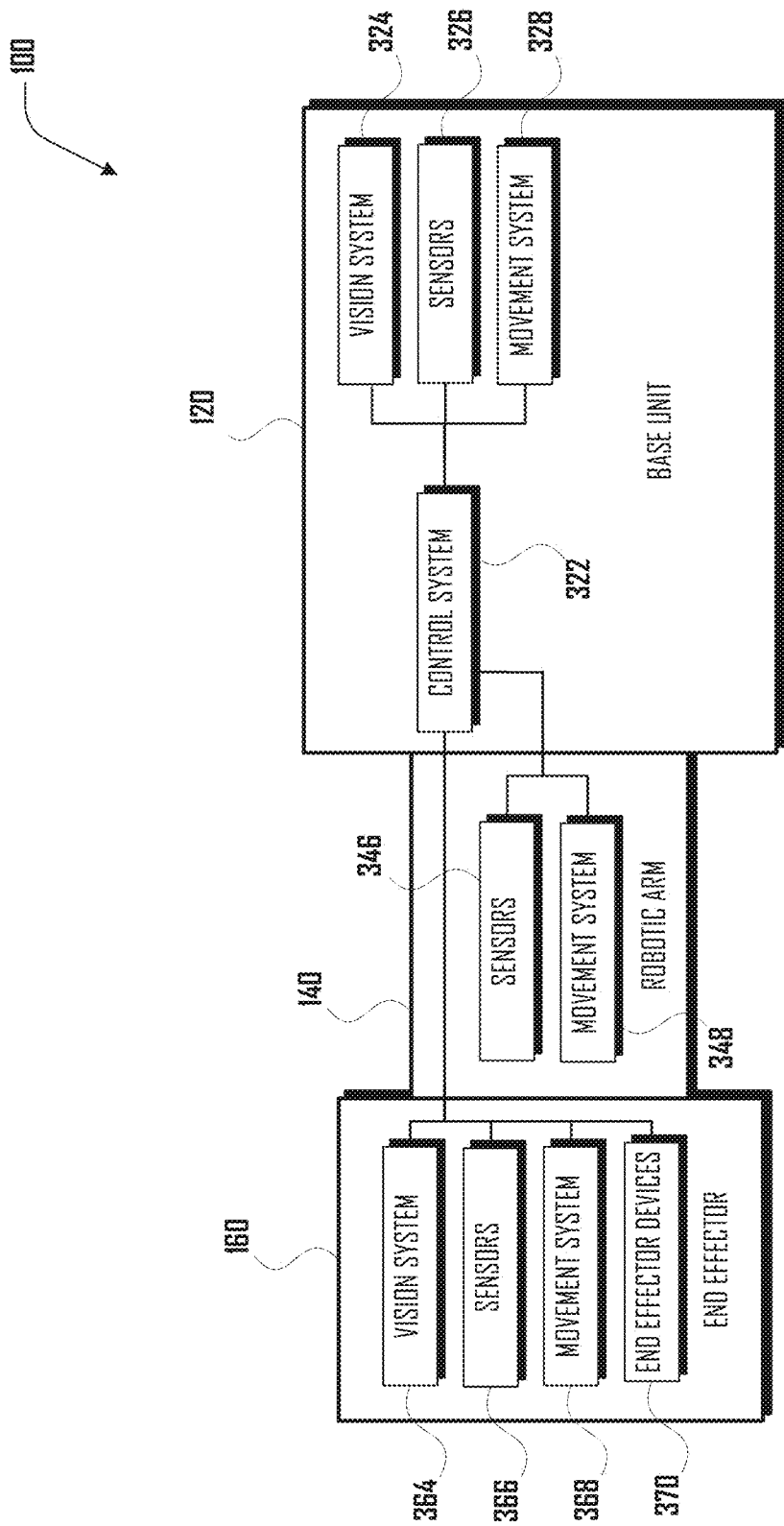
FIG. 3 is an exemplary block diagram illustrating systems of an automated drywalling system in accordance with one embodiment.

Turning to FIG. 3, a block diagram of a drywalling system 100 is illustrated, which includes a base unit 120 coupled to a robotic arm 140, which is coupled to an end effector 160. The base unit 120 is shown comprising a control system 322, which is operably coupled to a vision system 324, sensors 326, and a movement system 328. The robotic arm 140 is shown comprising sensors 346 and a movement system 348, which are operably coupled to the control system 322. The example end effector 160 is shown comprising a vision system 364, sensors 366, a movement system 368, and one or more end effector devices 370, which are operably connected to the control system 322.

In various embodiments, the connections between the control system 322 and respective vision systems 324, 364; respective sensors 326, 346, 366; respective movement systems 328, 348, 368; and end effector devices 370 can comprise any suitable type of connection including wired and/or wireless connections. For example, such connections can be configured for digital and/or analog communication of information between respective elements.

The vision systems 324, 364 can comprise one or more suitable vision system including one or more visible spectrum camera, radar, light detection and ranging (LIDAR) system, sonar, infrared camera, thermal camera, stereo cameras, structured light camera, laser scanners, and the like. The vision systems 324, 364 can comprise the same or different elements. Additionally, in some embodiments, one or both of the vision systems 324, 364 can be absent. In some embodiments, the robotic arm 140 can comprise a vision system.

The sensors 326, 346, 366 can comprise any suitable sensors in various embodiments including one or more sensors of humidity, temperature, air flow, laser curtains, proximity sensors, force and torque sensors, pressure sensors, limit switches, rotameter, spring and piston flow meter, ultrasonic flow meter, turbine meter, paddlewheel meter, variable area meter, positive displacement, vortex meter, pitot tube or differential pressure meters, magnetic meters, humidity sensor, conductivity sensor and depth or thickness sensors. The sensors 326, 346, 366 can comprise the same or different elements. Additionally, in some embodiments, one or more of the sensors 326, 346, 366 can be absent.

The movement systems 328, 348, 368 can comprise any suitable movement systems in various embodiments including one or more of an electric motor, pneumatic actuators, piezo electric actuator, and the like. For example, in some embodiments the movement system 328 of the base unit 120 can comprise the lift 126 and motors that drive wheels 128 of the cart 124 (see FIGS. 1 and 2). In another example, the movement system 348 of the robotic arm 140 can comprise pneumatic actuators 146 as illustrated in the examples of FIGS. 1 and 2. In various embodiments, the movement system 368 of the end effector 160 can comprise motors or other systems that are configured to move, change the orientation of, rotate, or otherwise configure the end effector 160. In some embodiments, one or more of the movement systems 328, 348, 368 can be absent.

As discussed herein, the one or more end effector devices 370 can comprise various suitable devices, including a cutting device, hanging device, mudding device, sanding device, painting device, vacuum device, and the like. Other suitable devices can be part of an end effector 160 and can be selected based on any desired task that the end effector 160 can be used for.

As discussed in more detail herein, the control system 322 can receive data from the vision systems 324, 364 and/or sensors 326, 346, 366 can drive the movement systems 328, 348, 368 and one or more end effector devices 370 to perform various tasks including drywall planning, drywall hanging, applying mud or joint compound to hung drywall, sanding mudded drywall, painting, and the like. Accordingly, the control system 322 can drive the drywalling system 100 to perform various suitable tasks, with some or all portions of such tasks being automated and performed with or without user interaction. The control system can comprise various suitable computing systems, including one or more processor and one or more memory storing instructions that if executed by the one or more processor, provide for the execution of tasks by the automated drywalling system 100 as discussed in detail herein. Additionally, while a control system 322 is shown as being part of the base unit 120, in further embodiments, the control system can be part of the robotic arm 140 or end effector 160. Also, further examples can include a plurality of control systems and/or control sub-systems, which can be suitably disposed in one or more of the base unit 120, robotic arm 140, and/or end effector 160.

Figure 4:
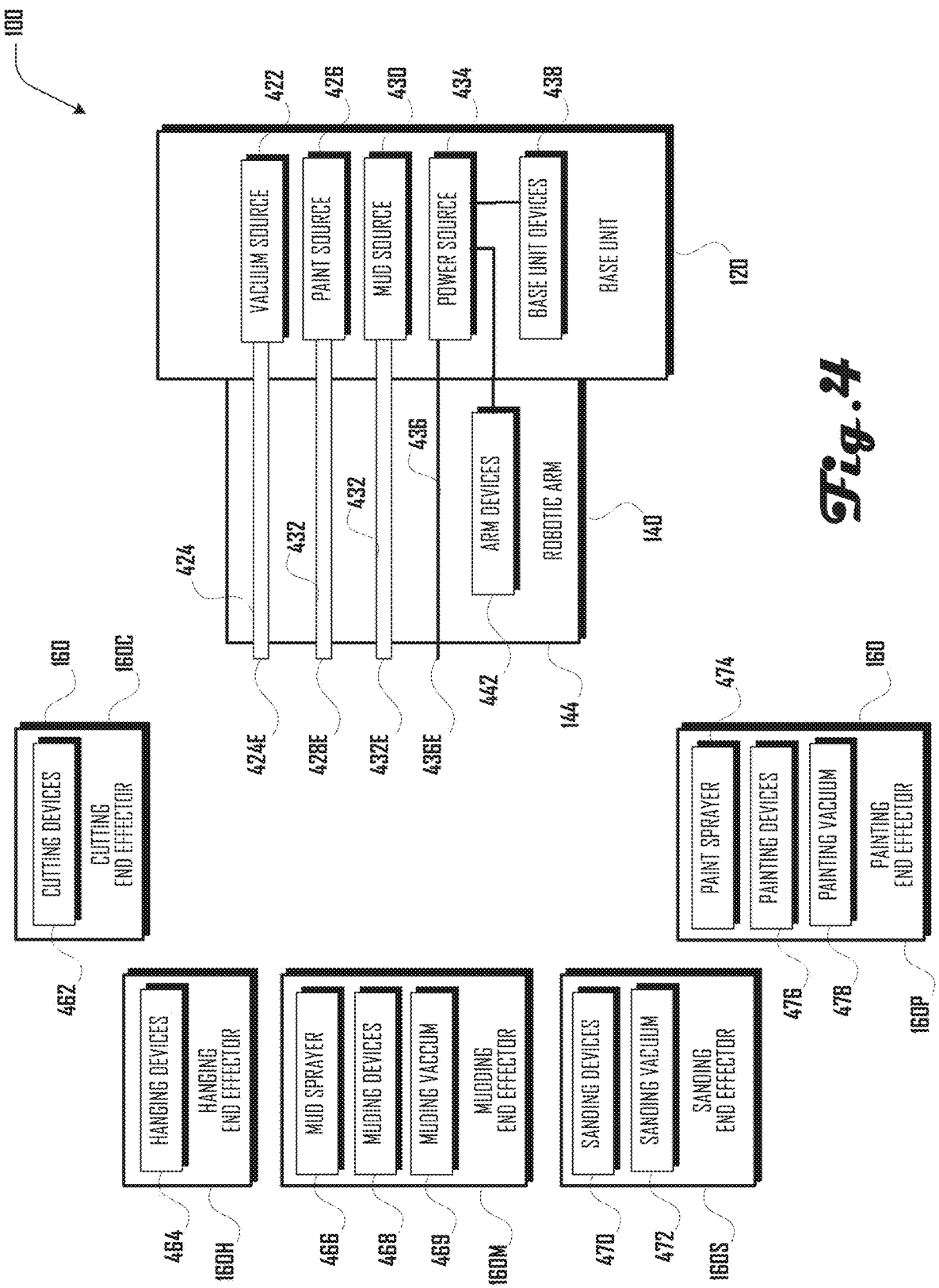
FIG. 4 is an exemplary block diagram illustrating systems of an automated drywalling system in accordance with one embodiment, including a plurality of end effectors configured to couple to an end of a robotic arm.

Turning to FIG. 4, an exemplary block diagram illustrating systems of an automated drywalling system 100 that includes a base unit 120 coupled to a robotic arm 140 and including a plurality of end effectors 160 configured to couple to the distal end 144 of the robotic arm 140. In this example, the end effectors 160 include a cutting end effector 160C, a hanging end effector 160H, a mudding end effector 160M, a sanding end effector 160S and a painting end effector 160P.

As shown in FIG. 4, the base unit 120 can comprise a vacuum source 422, a paint source 426, a mud source 430, a power source 432, and one or more base unit devices 438. In various embodiments, one or more of the vacuum source 422, paint source 426, mud source 430, and power source 432 can couple with a hub 130 (FIGS. 1 and 2) and provide resources to an end effector 160 coupled at the distal end 144 of the robotic arm 140 and/or to the robotic arm 140. For example, the vacuum source 422 can be coupled with a vacuum tube 424 that extends via the robotic arm 140 to an end 424E, which can couple with an end effector 160 as discussed herein. The paint source 426 can be coupled with a paint tube 432 that extends via the robotic arm 140 to an end 432E, which can couple with an end effector 160 as discussed herein. The mud source 430 can be coupled with a mud tube 432 that extends via the robotic arm 140 to an end 432E, which can couple with an end effector 160 as discussed herein.

The power source 434 can be coupled with a power line 436 that extends via the robotic arm 140 to an end 436E, which can couple with an end effector 160 as discussed herein. Additionally, the power source 434 can provide power to arm devices 442 of the robotic arm 140 (e.g., sensors 346 and movement system 348) and to base unit devices 438 of the base unit 120 (e.g., control system 322, vision system 324, sensors 326 and movement system 328). In various embodiments, the power source can comprise one or more batteries and/or can be configured to plug into wall receptacles at a work site. For example, a power cord can be coupled to the power source 438, which allow the drywalling system 100 to be powered by local power at a worksite via a wall receptacle, generator, external batteries, or the like. However, in some embodiments, the automated drywalling system 100 can be completely self-powered and can be configured to operate without external power sources at a worksite. In further embodiments, the robotic arm 140 and/or end effectors 160 can comprise a separate power source that can be separate from the power source 438 of the base unit.

In various embodiments, the automated drywalling system 100 can be configured to perform a plurality of tasks related to installing and finishing drywall in construction. In such embodiments, it can be desirable to have a base unit 120 and robotic arm 140 that can couple with and operate a plurality of different end effectors 160 to perform one or more tasks or portions of tasks related to drywalling. For example, the cutting end effector 160C, hanging end effector 160H, mudding end effector 160M, sanding end effector 160S and painting end effector 160P can be selectively coupled with the robotic arm 140 at the distal end 144 to perform respective tasks or portions of tasks related to drywalling.

For example, the cutting end effector 160C can be coupled at the distal end 144 of the robotic arm 140 and coupled with the power line 436 to power cutting devices 462 of the cutting end effector 160C. The cutting end effector 160C can be controlled by the automated drywalling system 100 to cut drywall or perform other cutting operations. In some examples, the cutting end effector 160C can comprise a cutting vacuum that is coupled to vacuum source 422 via the vacuum line 424 to ingest debris generated by cutting done by the cutting end effector 160C.

The hanging end effector 160H can alternatively be coupled at the distal end 144 of the robotic arm 140 and coupled with the power line 436 to power hanging devices 464 of the hanging end effector 160H. The hanging end effector 160H can be controlled by the automated drywalling system 100 to hang drywall, assist with drywall hanging, or the like.

The mudding end effector 160M can alternatively be coupled at the distal end 144 of the robotic arm 140 and coupled with the power line 436 to power mudding devices 466 and/or mudding applicators 468 of the mudding end effector 160M. The mudding end effector 160M can be controlled by the automated drywalling system 100 to perform "mudding" or "mud work" associated with drywalling, including application of joint compound (also known as "mud") to joints between pieces of hung drywall, and the like. Joint compound as discussed herein can encompass pre-mixed, topping, taping, multi-use, all-purpose, and setting type compounds. Additionally, the mudding end effector can also be configured to apply joint tape, or the like. Additionally, the mudding end effector 160M can comprise a mudding vacuum 469 that is coupled to vacuum source 422 via the vacuum line 424 to ingest excess joint compound or mud generated by the mudding end effector 160M.

The sanding end effector 160S can alternatively be coupled at the distal end 144 of the robotic arm 140 and coupled with the power line 436 to power sanding devices 464 of the sanding end effector 160S. The sanding end effector 160S can be controlled by the automated drywalling system 100 to sand mudded drywall, and the like. Additionally, the sanding end effector 160S can comprise a sanding vacuum 472 that is coupled to vacuum source 422 via the vacuum line 424 to ingest debris generated by sanding done by the sanding end effector 160S.

The painting end effector 160P can alternatively be coupled at the distal end 144 of the robotic arm 140 and coupled with the power line 436 to power a paint sprayer 474 and/or painting devices 476 of the painting end effector 160P. The painting end effector 160P can be controlled by the automated drywalling system 100 to paint drywall or other surfaces. Additionally, the painting end effector 160P can comprise a painting vacuum 472 that is coupled to vacuum source 422 via the vacuum line 424 to ingest excess paint spray generated by painting done by the painting end effector 160P.

Although the example automated drywalling system 100 of FIG. 4 is illustrated having five modular end effectors 160, other embodiments can include any suitable plurality of modular end effectors 160, with such end effectors 160 having any suitable configuration, and being for any suitable task or purpose. In further examples, the automated drywalling system 100 can comprise a single end effector 160, which can be permanently or removably coupled to the robotic arm 140. Additionally, in some examples a given end effector 160 can be configured to perform a plurality of tasks. For example, in one embodiment, an end effector 160 can be configured for mud work, sanding and painting. Accordingly, the example of FIG. 4 should not be construed to be limiting on the wide variety of other embodiments that are within the scope and spirit of the present disclosure.

Figure 5:
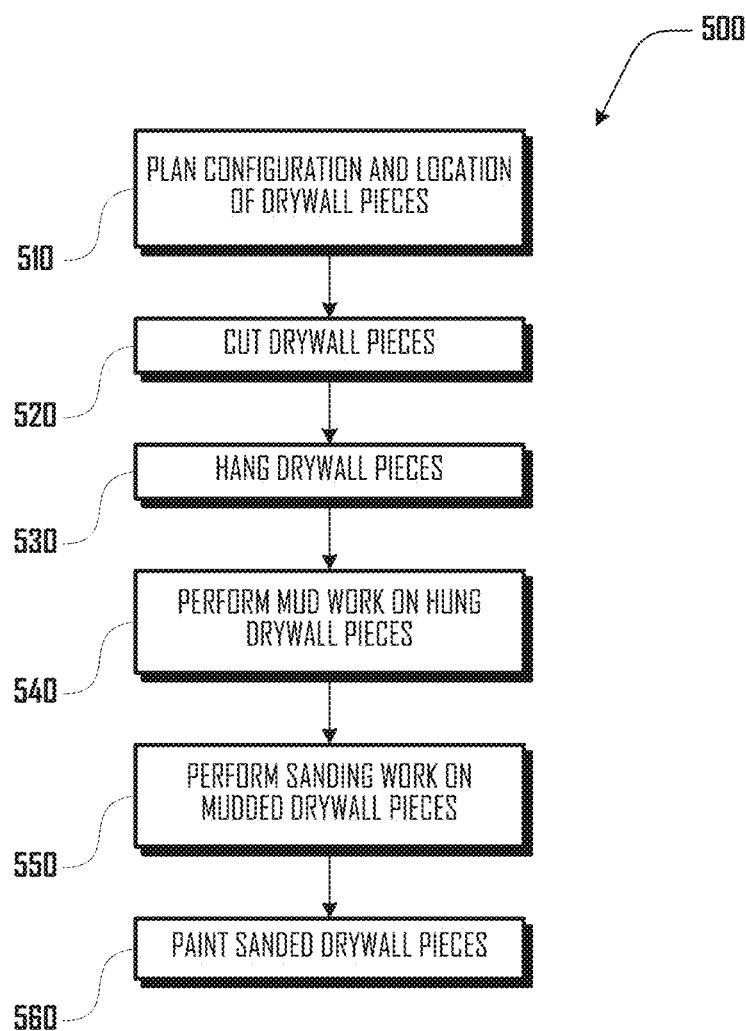
FIG. 5 illustrates a block diagram of method of installing drywall in accordance with one embodiment.

Turning to FIG. 5, a method 500 of drywalling is illustrated, which can be performed in whole or in part by an automated drywalling system 100 as discussed herein. The example method 500 or portions thereof can be performed automatically by the automated drywalling system 100 with or without user interaction.

The method 500 begins at 510, where a configuration and location of drywall pieces is planned. For example, in some embodiments, the automated drywalling system 100 can be configured for automated scanning and mapping of a worksite (e.g., framing elements of a house or building) and automated planning of the shapes and sizes of drywall to be disposed at the worksite to generate walls, ceilings, and the like. Such scanning and mapping can include use of vision systems 324, 364 (FIG. 3) and the like. Planning of shapes and sizes of drywall can be based at least in part on the scanning and mapping and can be performed by a computing device 100 of the automated drywalling system 100 or other suitable device which can be proximate or remote from the automated drywalling system 100. In some embodiments, such planning can be based at least in part on building plans or maps that were not generated by the automated drywalling system 100.

The method 500 continues to 520, where drywall pieces are cut. Such cutting can be based at least in part on the scanning, mapping and planning discussed above. Additionally, such cutting can be performed by the automated drywalling system 100 at a worksite (e.g., via a cutting end effector 160C) or can be performed by a system remote from the worksite and generated drywall pieces can be delivered to the worksite.

At 530, generated pieces of drywall can be hung at the worksite, including hanging on studs, beams, posts, wall plates, lintels, joists, and the like, to define walls, ceilings and the like. Screws, nails or other suitable fasteners can be used to hang the drywall pieces. In some embodiments, the automated drywalling system 100 can be configured to hang drywall pieces including positioning the drywall pieces and coupling the drywall pieces in a desired location. In some examples, the automated drywall system 100 can be configured to assist a user in hanging drywall, including holding the drywall and/or tools in place while the user fixes the drywall pieces in place. In various examples, a hanging end effector 160H can be used for such drywall hanging.

At 540, mud work can be performed on the pieces of hung drywall. For example, joint compound (known also as "mud") can be applied to seams or joints between adjacent pieces of drywall, over surfaces of the drywall, and/or can be applied over fasteners such as drywall screws or the like. In various examples, a mudding end effector 160M can be used to perform such mud work.

At 550, sanding can be performed on the mudded pieces of drywall. For example, where wet joint compound is applied to hung drywall pieces, the joint compound can be allowed to dry and can then be sanded by a sanding end effector 160S of an automated drywall system 100. In various examples, sanding can be performed to smooth out joint compound to generate a planar or otherwise consistent profile on the pieces of drywall in preparation for painting. At 560, the sanded drywall pieces can be painted. For example, in various examples, a painting end effector 160P of an automated drywalling system 100 can be used to paint the drywall pieces.

Although the method 500 of FIG. 5 relates to hanging and finishing drywall, it should be clear that other hanging and finishing methods can similarly be employed by the automated drywalling system 100, including methods related to hanging particle board, plywood, sheet rock, laminate, tile, wall boards, metal sheeting, lath and the like. Similarly the methods can be used with different coatings including plaster, polymer coatings, cement, stucco, organic coatings, and the like. Accordingly, the method 500 of FIG. 5 should not be construed to be limiting.

During mud work, the automated drywalling system 100 can apply a layer or profile of compound that is greater than a thickness that can be conventionally manually applied by human workers to allow for a sanding system (e.g., a sanding end effector 160S) to sand down the compound to a desired plane. For example, in some examples, manual joint compound application mud can be profiled to taper from high points. The automated drywalling system 100 can apply a thicker layer than normal enabling a sanding system to sand down high points to be level to the adjacent surfaces.

For example, FIGS. 6a, 6b, 6c, 6d and 6e illustrate one example of a mud application profile for a pair of drywall pieces 610A, 610B that form a seam 620, where joint compound 630 is applied over consecutive layers, which can include joint tape 640, to taper out the high points of joint compound 630 over a wider area. Sanding can then be used to smooth out the final profile. The high points of joint compound 630 can be caused by various features, including the seam 620, feature, raised stud, defect, or any combination of these. In some embodiments, such a mud application can be undesirable for automated application; however, in further embodiments, such a mud application profile can be employed by an automated system such as the automated drywalling system 100.

FIGS. 7a and 7b illustrate an example joint compound application process where the joint compound 630 is applied in a thick layer using a sprayer that generates a mud spray 700. Such an application process can be performed by the automated drywalling system 100 in various embodiments. The thickness of the joint compound 630 being applied to the pieces of drywall 610A, 610B defining the seam 620 can allow for a sanding system to be used to sand back high points of joint compound 630 to a level surface. The high points of joint compound 630 can be caused by the seam 620, feature, raised stud, defect, or any combination of these.

Figure 8A:
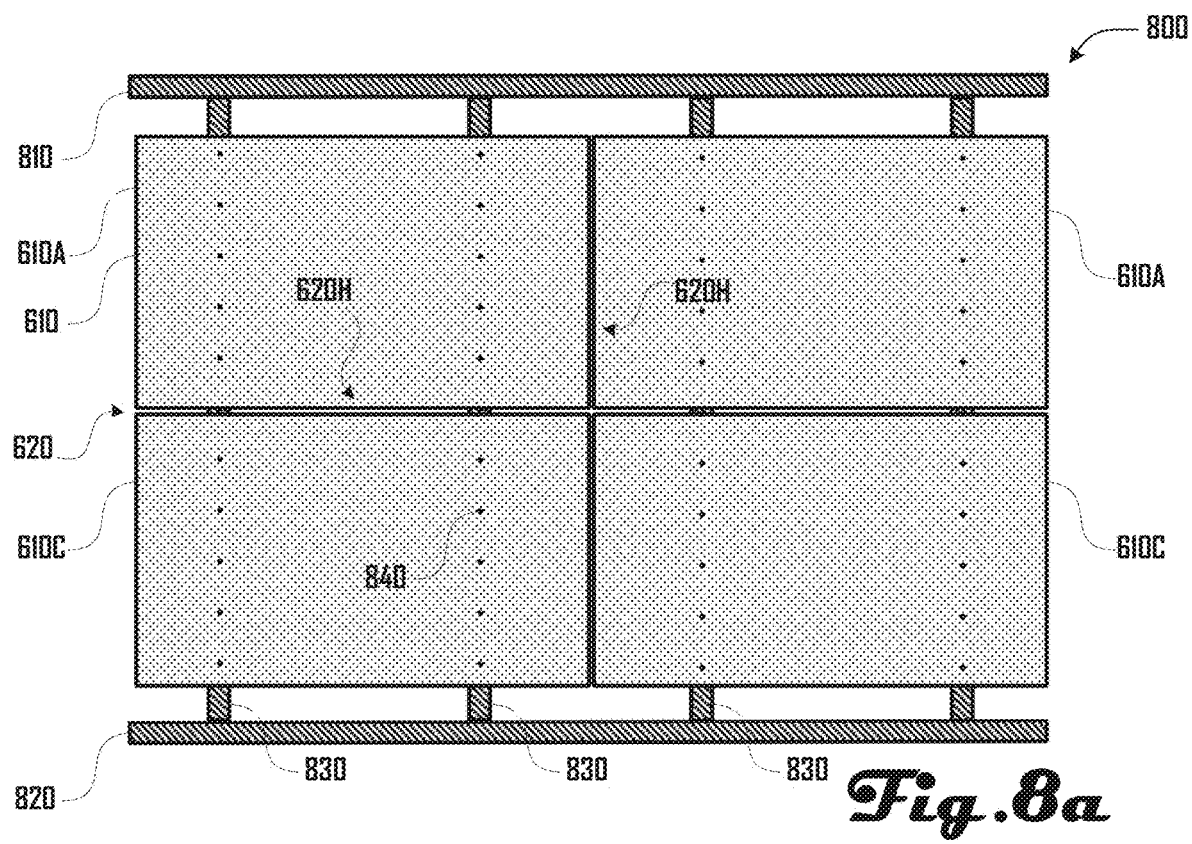
Figure 8B:
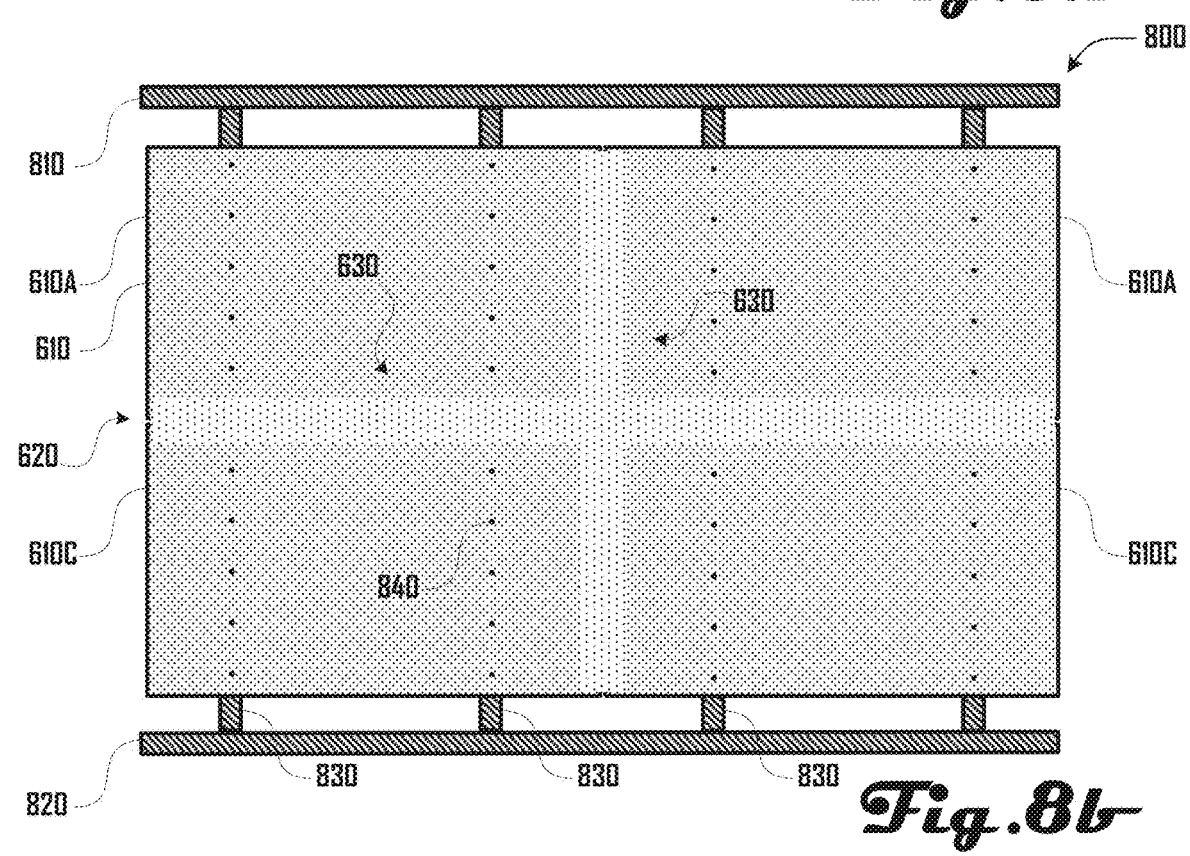

Turning to FIGS. 8a, 8b and 9, examples of a wall assembly 800 including a plurality of drywall pieces 610A, 610B, 610C, 610D is illustrated. The wall assembly 800 can comprise a header 810 and footer 820, with a plurality of studs 830 extending therebetween. As shown in FIG. 8a, the drywall pieces 610 can be coupled to the studs 830 via a plurality of fasteners (e.g., drywall screws) that extend though the drywall pieces 610 and into the studs 830. The drywall pieces 610 can define one or more seams 620, including in the example of FIG. 8a a vertical seam 620V and a horizontal seam 630H. In some embodiments, mud work can be performed on the seams 620 as shown in FIG. 8b and leaving portions of the drywall pieces 610 without joint compound 630. Additionally or alternatively, joint compound can be applied to portions of the drywall pieces 610 in addition to about the seams 620 as shown in FIG. 9.

The wall assembly 800 of FIG. 8b or 9 can then be sanded to generate a smooth profile or other profile as desired.

Figure 10:
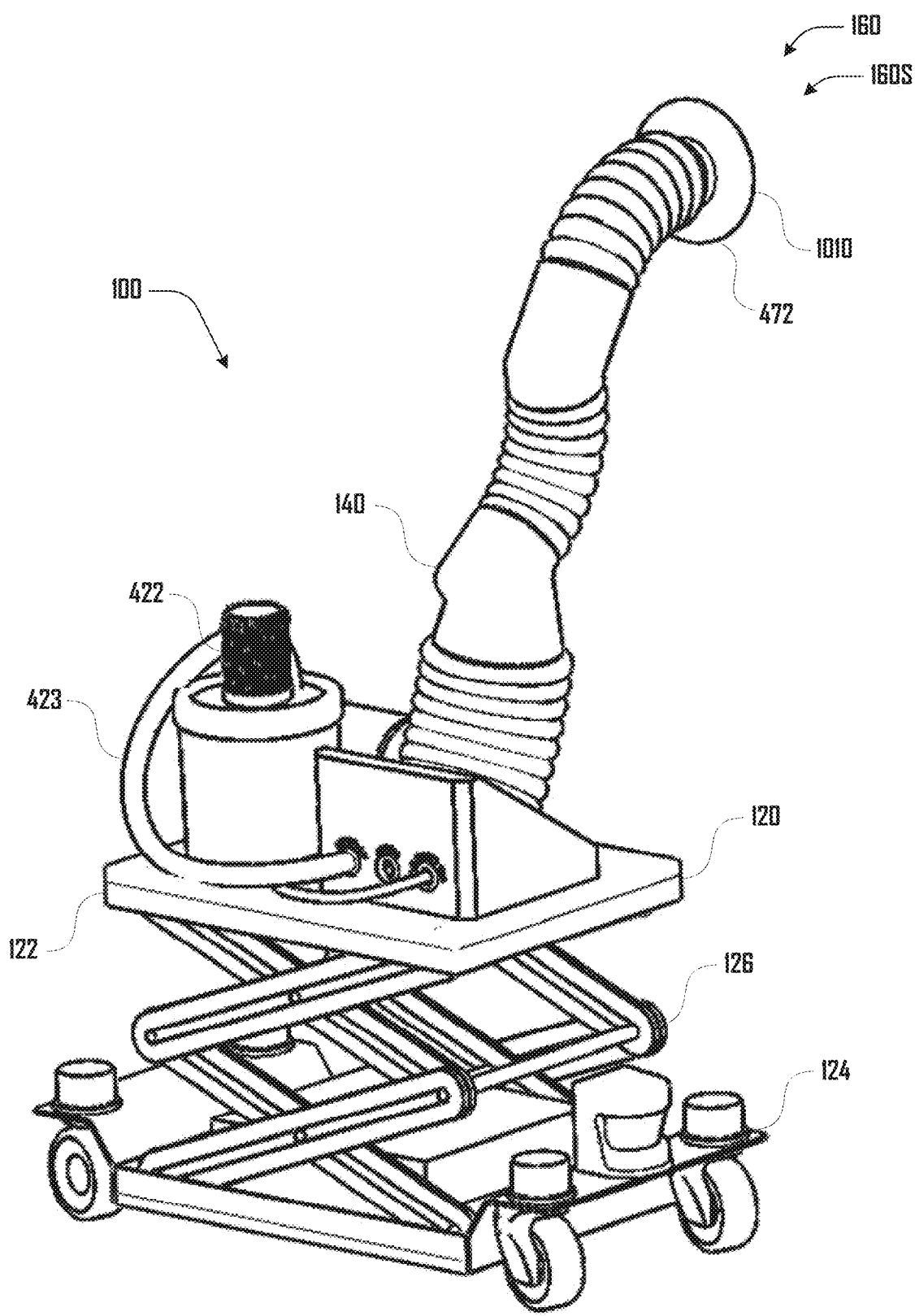
FIG. 10 illustrates an embodiment of a drywalling system sanding a wall assembly in accordance with one embodiment.

FIG. 10 illustrates one example embodiment of the automated drywall system 100, having a sanding end effector 160S that is configured to sand various surfaces, including drywall that has been covered with joint compound (e.g., FIG. 8b or 9). In this example embodiment, the system 100 is shown comprising a robotic arm 140 with a sanding end effector 160S that includes a sander 1010, which includes an integrated vacuum system 472. The robotic arm 140 and end effector 160 are shown mounted on a mobile base 120 with a vertical lift 126. The base unit 120 can carry supporting systems for the automated drywall system 100 and sanding end effector 160S, including a vacuum source 422 that provides a vacuum to the sanding end effector 160S via a vacuum line 424.

The automated drywalling system 100 can utilize a powered or unpowered sander 1010 to smooth or remove joint compound 630 or other materials such as plaster or the like. The powered sander 1010 can be a rotary sander, an orbital sander, a belt sander, a random-orbit sander, detail sander, oscillating edge, spindle sander, drum sander, finishing sander, or the like. The sander 1010 can use square, rectangular, triangular, circular, or any other shape of sanding paper, sanding mesh, or sanding screen. The sander 1010 can comprise a single sanding head, two, three, four, or any multiple of sanding heads. The sanding heads can all be of the same type or any combination of types of sander heads. In some embodiments, a sanding end effector 160S can comprise a plurality of sanders 1010, which can respectively comprise one or more sanding heads.

The sander 1010 can be integrated as a sanding end effector 160S on a robotic arm 140, positioning stage, gantry, or the like. The robotic arm 140 can utilize force control to apply a controlled constant pressure required to remove the desired amount of material or achieve the desired surface texture or roughness. By controlling or measuring and accounting for sanding pressure, tool and toolpath parameters, and compound composition the required material can be removed to achieve the desired flatness. The system 100 can also utilize information on the location and type of seams, defects or other obstacles to determine optimal toolpath and/or tool parameters. Tool parameters that can be controlled include, but are not limited to applied normal force or pressure, rotational speed of the sander, sander torque, and paper grit. Tool path parameters can include, but are not limited to, speed at which the tool moves relative to the board or into the board also known as feeds, dwell time at a given point, size of overlap, lead-in and lead-out sequences, path sequence, direction of feed relative to the tool rotation.

A single robotic arm 140 or any suitable plurality of robotic arms 140 can be used to complete the task through coordinated or individual paths. For example, in some embodiments, a base unit can comprise a plurality of robotic arms 140. The one or more robotic arms 140 or tool stages can be moved around the room using the mobile base unit 120 that can be powered or moved manually by an operator. The mobile base 120, end effectors 160, and robotic arms 140 can include one or more sets of sensors 326, 346, 366 and/or vision systems 324, 364 to ensure safe operation next to the user. Safety sensors can include, but are not limited to, laser curtains, proximity sensors, force and torque sensors, pressure sensors, limit switches, system to track location of the user relative to the robot or mobile base, speed limiters, vision systems, LIDAR, radar, sonar, or any combination of these. As discussed herein, the mobile base 120 can include a vertical lift 126 that can be powered or unpowered. The vertical lift 126 can be used to lift or lower the robotic arm 140, end effector 160, positioning stage, gantry and/or sanding tool. The lift 126 can be instrumented with a position sensor that can be used to capture and control the height of the lift 126.

The automated drywalling system 100 can be controlled using a planning system (e.g., running on the control system 322) that takes a variety of inputs to determine sanding tool paths for the base unit 120, robotic arm 140, and/or end effector 160, which can include tool paths and tool parameters to achieve the desired sanding finish. In some examples, a first step in a method for automated sanding of drywall is to create a map of the target surfaces. This map or model can be created by importing building information modeling (BIM) and/or 2D, 3D plans into the planner system. The map can also be created directly by the system 100 by utilizing sensors 326, 346, 366 and/or vision systems 324, 364 to scan the room. In various examples, vision systems 324, 364 can include stereo cameras, structured light, cameras, LIDAR, radar, sonar, laser scanners, thermal imaging or any combination of these components. Uploaded 3D or 2D plans can be combined with field data to create a more accurate map of the environment. The data from different sources can be combined using key features and user input. The map can include the location of the framing studs as well as pipes, electrical conduit, ventilation ducts, and any other components installed on the walls or ceilings. These locations can have been derived from the uploaded plans, the room scan, user inputs, or any combination of these. To facilitate the creation of the map, the user can help identify features through analysis of images, tagging of the features physically or digitally. The user can physically tag components using a laser, tags, markers or a combination of these. The scanning or vision systems 324, 364 can pick up or track these tags as the user moves around the room and locates the features. The mapping system or planner can also take as an input the layout of the drywall boards 610 in the room to locate seams 620. Another input can be the tool paths and tool parameters used by the system 100 to apply the joint compound, plaster, or coating on the surfaces, which can provide an estimate to condition of the surface including thickness of the material, planarity, flatness of the wall, and location of high or low points.

The automated drywalling system 100 can include a computational planner (e.g., that runs on the control system 322 or other computing suitable device) which can utilize a map uploaded to the system 100 or created by a mapping system of the drywalling system 100 to determine tool paths and/or tool parameters required to achieve a desired sanding finish. The planner can create toolpaths off a global map of the room and then update these paths given updated local measurements once the base unit 120, robotic arm 140 and/or end effector 160 are in place. The planner can be informed by thickness measurements, vision system data on the flatness of the wall, or information recorded on how the mud was applied in previous steps by the system 100, user inputs, location of seams as specified by a layout planner or a scan of the room after the substrate was applied. The planner can produce toolpaths and tool parameters to enable the system 100 to smooth out joints, seams, low points, high points, and other features to create a visually flat wall. The parameters can also be determined based on the desired or required finish. Areas that are exposed to changing, harsh, or bright lights and areas that will be painted to a glossy finish can receive a higher quality finish with tighter controls on roughness, planarity, and tool overlaps.

2D or 3D maps created by the system 100 can be registered to the physical environment utilizing recognizable features such as doors, windows, outlets or corners. The registration can also be done using markers, tags, or laser outlines that are placed in the room. A projection or visualization system can find the features or markers and can locate the maps created using such features. The system 100 can utilize a user interface to enable the user to help locate the map or projection relative to the environment and resolve any issues or discrepancies. The user can utilize a physical marker to signify key features for the system 100 allowing the system 100 to locate the plan relative to the environment. The system 100 can also use the robotic arm 140 and/or end effector 160 to find target features, markers or surfaces and locate them relative to the base unit 120, which can be located using a localization system, which can include one or more of the sensors 326, 346, 366 and/or vision systems 324, 364, which in some examples can include laser range finders, computer vision, LIDAR, radar, sonar, stereo vision, odometry, IMUs, or any combination of these.

The robotic arm 140 can utilize a compliant end effector 160 to enable safe contact with the environment allowing the system 100 to accurately locate target surfaces, features or components, accommodate errors in positioning without damaging the target substrate or the robotic arm 140. By utilizing the robotic arm 140 and compliant end effector 160 to locate a physical component, the system 100 can establish a point, line, or plane and therefore locate the virtual plan on the environment. The toolpaths can then be updated from the virtual plane to the physical plane. Refitting of the paths onto the contacted surfaces can enable the system 100 to deal with errors and discrepancies between the modeled and physical environment. These tools can enable quick on-site calibration using global room wide maps and local measurements. Refitting the paths allows for errors in positioning of the base unit 120, robotic arm 140 and/or end effector 160. The system 100 or tool can also utilize one or more sensors 326, 346, 366 and/or vision systems 324, 364 (e.g., radar, sonar, thermal imaging, and the like) to establish what is behind the substrate, and this information can be used to update the virtual map and can ensure that no damage is done to any electrical, plumbing or ventilation.

The planner can output tool poses or tool paths for the base unit 120, robotic arm 140 and/or end effector 160 including, but not limited to, joint commands, target poses and end effector positions, or any combination of these. The system 100 can also output paths for a gantry system or positioning stage which can be used in conjunction with the base unit 120, robotic arm 140 and/or end effector 160, or without a robot, to move and position a sanding tool. The planner can also output paths for the mobile base 120 to position a gantry, positioning stage, or robotic manipulator 140, move a tool to assist the user in the finishing process, or position visualization and/or lighting equipment. The mobile base 120 and vertical lift 126 can work in coordination with the user, robotic arm 140, end effector 160, gantry or a combination of these to execute various tasks. The planner system can control the different components of the platform (e.g., the base unit 120, robotic arm 140 and/or end effector 160) allowing for coordinated movements and forces with the target goal of moving a tool (e.g., a sander 1010) to a desired position under the prescribed forces and moments. The position of the mobile base 120 can be used as a rough positioning stage, with the vertical lift 126 setting the height of the robotic manipulator 140 which can act as a fine positioning stage.

The automated drywalling system 100 can be instrumented with one or more sensors 326, 346, 366 and/or vision systems 324, 364 to improve operation and ensure quality. During sanding, the system 100 can use one or more of sensors 326, 346, 366 (e.g., force and torque sensors) which can be mounted directly on the end effector 160, on the robotic arm 140, or base unit 120. In some examples, force and torque estimates of the robotic joints can be used to apply a desired force during sanding. The sensors 326, 346, 366 can monitor only force normal to the sanding pad or multiple axes including torque measurements and six-axis sensing. The force sensing can be used to control the force or pressure applied at a sanding pad. A minimum force or contact readings can be used to ensure contact is made before the sander or tool is turned on, with force below a certain threshold or loss of contact triggering the sander or tool to turn off for safety. The system 100 can use the force information to operate in force control, where motions and speeds of the system 100 are driven to ensure a given force is applied in the desired directions. Similarly, force sensing can be used to detect contact with an object, obstacle, or intersecting wall or ceiling. By monitoring the forces and torque on the base unit 120, robotic arm 140 and/or end effector 160 the system 100 can detect that it has made contact with the adjacent wall or ceiling and alter the toolpath accordingly. The measurements can also be used to detect accidental contact and trigger a safety operation such as stopping the system 100 or retracting away from contact point. The base unit 120, robotic arm 140 and/or end effector 160 can also use one or more of sensors 326, 346, 366 and/or vision systems 324, 364 (e.g., contact or proximity sensors) to detect that the end effector 160 is touching the surface, obstacle, object, or worker, as well as detect the distance to an adjacent surface or contact with that surface. The force, contact, displacement, or proximity sensors can be mounted on outriggers from the end effector 160 to sense obstacles, objects, or adjacent surfaces ahead of a tool of the end effector 160. The system 100 can detect, follow, and use adjacent walls as datums to guide sanding and achieve accurate corners. For example, in some embodiments, the end effector 160 can comprise a guiding element configured to engage a target surface, adjacent walls, or the like, to allow the end effector 160 to be guided in sanding the target surface. For example, such a guiding element can include an arm extending from the end effector 160, with the arm having a roller at the end of the arm configured to engage the target surface or portion of a wall assembly as a sanding guide.

The system 100 can utilize multiple control strategies to complete the task. Position control can be used to command the base unit 120, robotic arm 140 and/or end effector 160 to follow a trajectory given speed, acceleration, jerk constraints, and the like. The system 100 can be controlled at the joint level by giving commands to joints of the base unit 120, robotic arm 140 and/or end effector 160 to achieve a desired robot state and tool position, or the control can be done at a higher level allowing a user or program to control end effector position and orientation. The system 100 can be controlled in task space where the system 100 controls the tool relative to the task. This approach can focuses on achieving a desired tool position, orientation, speed relative to the target surface rather than on each joint reaching its target goal. The automatic drywalling system 100 can utilize force control to control the force applied to a target surface, an obstacle, adjacent surfaces, objects and so on. The applied force can be controlled in a single or multiple axes. Hybrid control modes can also be used. For example the base unit 120, robotic arm 140 and/or end effector 160 can be commanded to achieve a given position as long as a given force is not exceeded.

In some embodiments, a sander 1010 can utilize a soft or conformable pad between a sanding head and sanding pad of the sander. The comfortable pad can be made out of foam or a soft polymer. The conformable pad can allow for the sanding pad (e.g., sandpaper, mesh or screen) to conform to the target surface facilitating sanding of features that are smaller in size than the diameter of the sanding pad. The conformable pad can be rotationally rigid such that it transmits the rotation or orbital movement of the sanding head to the sanding pad (e.g., sandpaper, mesh or screen).

In some embodiments, a sanding head of the sander 1010 can be mounted in series to a structure that limits, sets, or controls the amount of force applied on the surface, also known as the compliant stage. The structure can limit, set or control only the normal force applied on the surface by the sanding head or it can also limit, set or control forces applied by the sander along the sanding surface as well as torques applied. The structure can also utilize guides to ensure smooth linear motion of the sanding surface normal to the target surface. The guides can be a part of the compliant stage or they can be mounted in parallel with the stage. The guides can include mechanical guides such as a four-bar mechanism, sliders, telescoping systems, bushings, bearings, rod-and-piston cylinders. The guides can also be electro-magnetic, air bearings, magnetic bearings.

Figure 11:
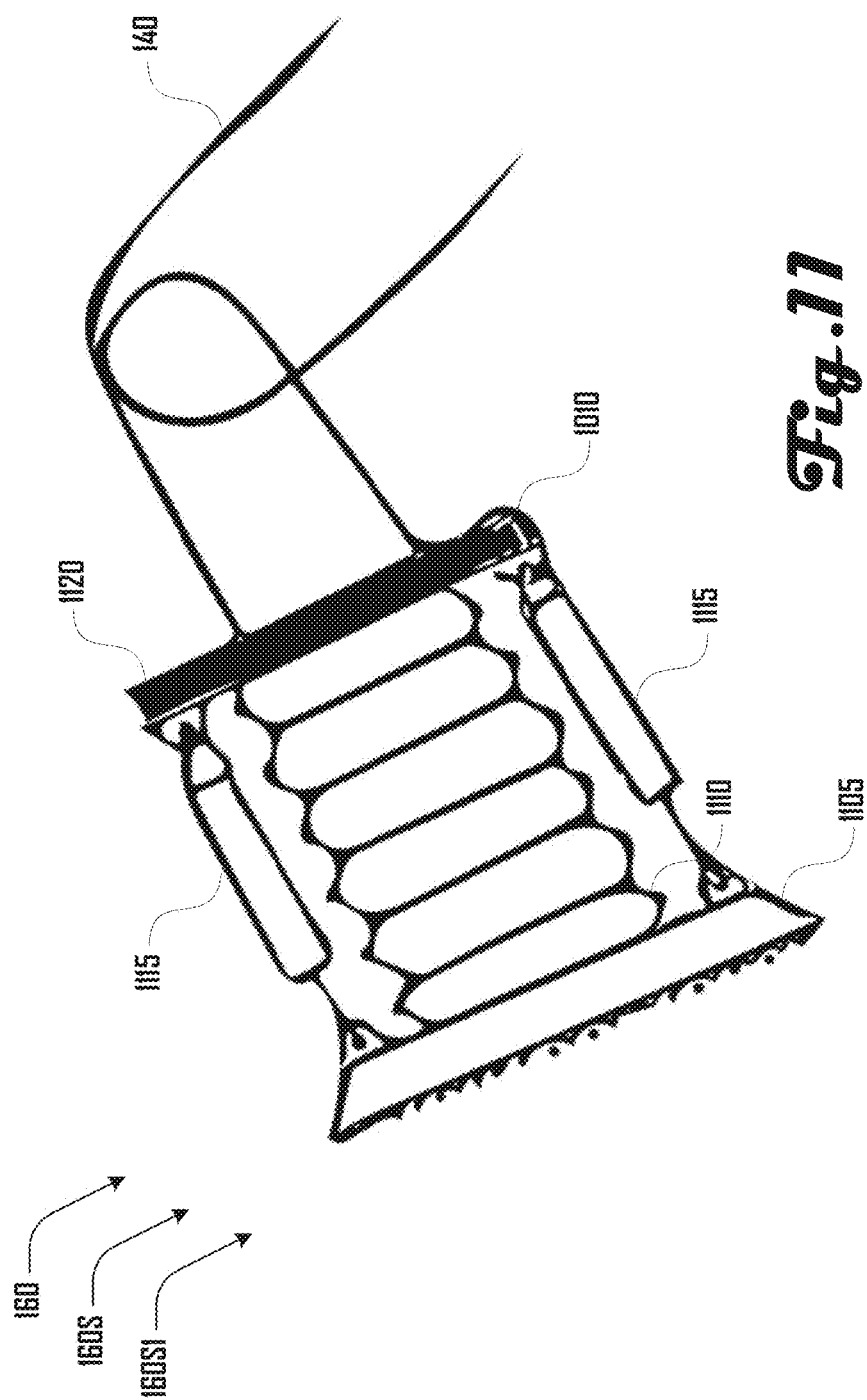
FIG. 11 illustrates an example embodiment of a sanding end effector that includes a sanding head mounted on an air spring in parallel with linear guides that can prevent the sanding head from rotating relative to a mounting flange.

FIG. 11 illustrates an example embodiment 160S1 of a sanding end effector 160S that includes a sanding head 1105 mounted on an air spring 1110 in parallel with linear guides 1115 that can prevent the sanding head 1105 from rotating relative to a mounting flange 1120. In some embodiments, the sander head 1105 can be mounted on an air bag, air shock, air cylinder, air bellows, air slide, or the like, with a fixed or variable pressure setting. The pressure and the normal area of such a pressure vessel can set an amount of forces applied by the sanding pad on the surface. In some embodiments, a sander 1010 can be mounted on a spring, tunable spring, or shock in order to set, limit or control the forces applied on the surface. The forces can also be set, limited, or controlled using a pressure controlled hydraulic system including a cylinder, bellows, or reservoir. In one embodiment, a short-stroke low-mass end effector linear actuator mechanism can be used for fast tracking of surface contours and constant normal force. In embodiments with more than one sanding head 1105 all sanding heads 1105 can be mounted on a single force limiting structure or each sanding 1105 head or multiple sanding heads 1105 can be mounted on separate structures. Mounting the sanding heads 1105 or group of sanding heads 1105 on separate structures can allows for sanding head forces and moments to be set, limited, or controlled separately.

The compliant stage can be mounted in parallel with another mechanism that provides rotational constraint. The compliant stage can be designed to be rotationally constrained such that the actuation of a powered sander 1010 does not twist the compliant stage. A rotational constraint mechanism can include a four-bar, linkages, sliding guides, air slide, or any other rotationally stiff guide.

In one embodiment, the normal force applied by a sander 1010 can be set, limited or controlled using air cylinders and a four-bar mechanism. The air cylinders can set the amount of force either statically with a pressure regulator or dynamically controlled by a valve and a pressure sensor. The air cylinders can be sized to accommodate different pressure ranges and forces. The stroke of the cylinders can be set to enable the required stroke or to limit the stroke of the system 100. The stroke of the mechanism can be monitored through an encoder mounted directly on the cylinder stroke or in parallel with the cylinder. A string encoder can be used to measure the stroke of the mechanism. A magnetic piston's position can be picked up by a sensor mounted on the cylinder body. The four bar mechanism can guide the motion of the sanding head 1105 and can act to prevent rotation between mounting points such that a sanding head mount does not rotate relative to a mounting that coupled the end effector 160 to the robotic arm 160.

Figure 12:
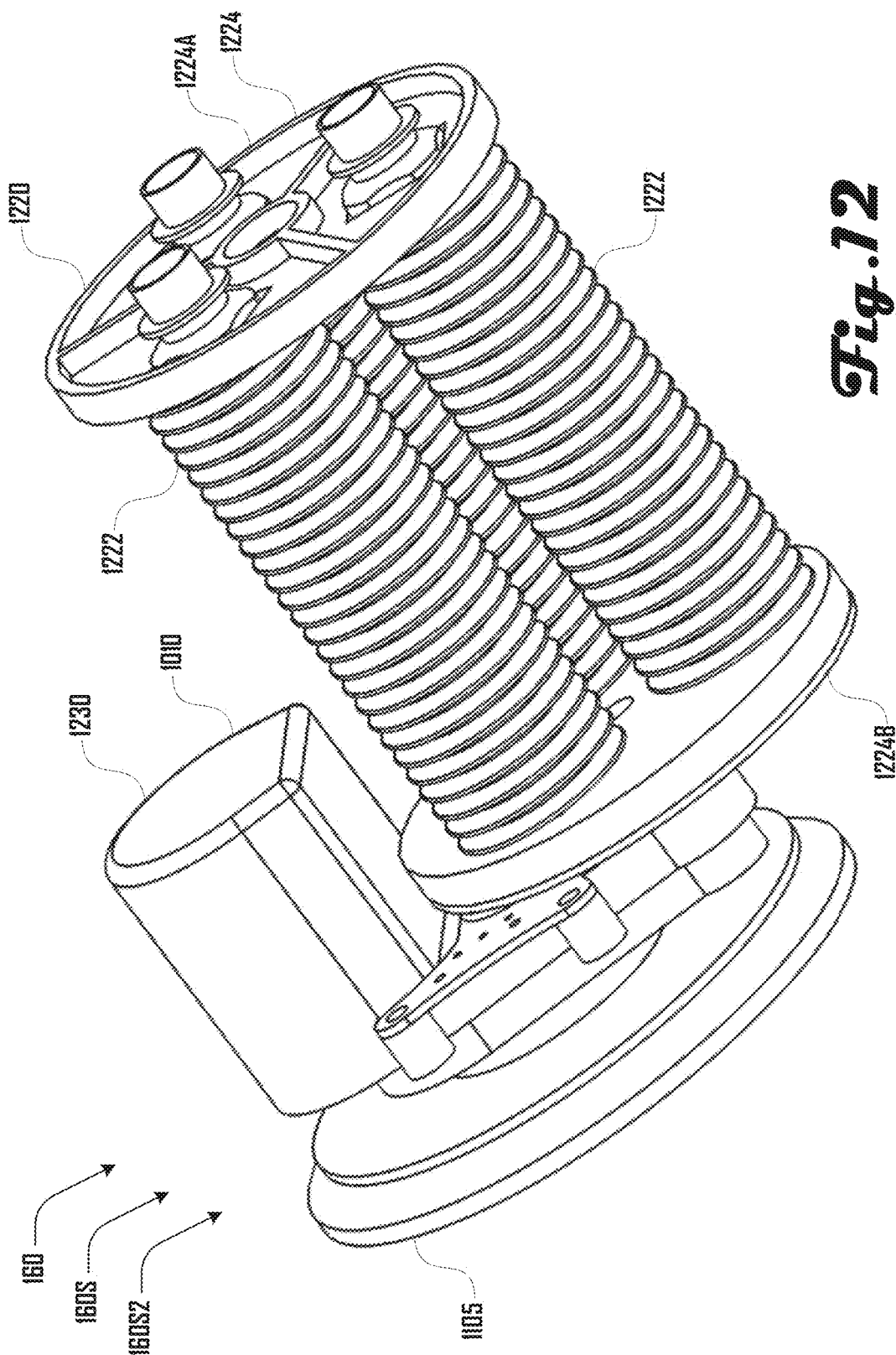
FIG. 12 illustrates another example embodiment of a sanding end effector that includes a bellows stage assembly that comprises three pneumatic bellows that can be configured to set the tip-tilt angle of a sanding head coupled to the bellows stage assembly.

In another embodiment, the normal force and moments acting on the surface can be set, limited or controlled using one or more bellows. For example, FIG. 12 illustrates one example embodiment 160S2 of a sanding end effector 160S that includes a bellows stage assembly 1220 that comprises three pneumatic bellows 1222 that can be configured to set the tip-tilt angle of a sanding head 1105 coupled to the bellows stage assembly 1220. As shown in this example, the three bellows 1222 can extend in parallel between a first and second plate 1224A, 1224B with the sanding head 1105 being coupled to the second plate 1224B. In various embodiments, the first plate 1224A can be coupled to the robotic arm 140 of the system 100. The sander 1010 can be run by a sanding motor 1230 that moves the sanding head 1105.

To actuate the sander 1010, one or more of the bellows 1222 can be selectively inflated and/or deflated by the system 100, which can change the length of the respective bellows 1224 and thereby change the orientation of the plates 1224 relative to each other. Additionally, in various embodiments, the bellows stage assembly 1220 can be used to control the force applied on a target surface by controlling the pressure in the bellows 1224. For example, increasing pressure in the bellows 1224 collectively can increase pressure applied by the sanding head 1105 to a target surface.

In various embodiments, a bellows stage assembly 1220 can comprise two or more bellows 1224 in parallel, each with its own pressure regulation that allows each of the bellows 1224 to be inflated and/or deflated separately. In some examples, the bellows 1224 can be constrained (e.g., to each other, to a central spine, or the like) to constrain rotational motion between the two mounting plates 1226. The pressure in each bellows 1224 can be set or dynamically controlled to control the force and moments acting on the surface via the sanding head 1105. The bellow structure can also be used to control the plane of the sanding surface relative to the target plane. Setting a common pressure to each of the bellows 1224 can result in constant force and constant moments. By increasing or lowering the pressure in each of the bellows 1224, the applied force and moments can be controlled. Increasing or lowering the difference in pressure between the bellows 1224 can set the angle of the sanding surface. Another embodiment can comprise one or more fluidic cylinders, air slides, or the like, to set, limit, or control the applied forces and moments as well as the tip-tilt of the sanding head 1105. The tip-tilt of the sanding head 1105 can be recorded using one or more sensors 326, 346, 366 and/or vision systems 324, 364, which can include IMUs, laser range finders, sonar sensors, capacitance sensors, encoders, potentiometers, bend or stretch sensors, stroke sensors on the cylinders, or any combination of these.

A short-stroke low-mass end effector linear actuator mechanism can be used for fast tracking of the surface contours, applying constant normal force, and/or compensating for errors in the positioning of the tool of an end effector 160 relative to a target surface. The linear actuator can comprise a pneumatic or hydraulic cylinder with pressure and position sensors, a linear mechanical actuator, piezo-electric actuator, electro-mechanical actuator, linear motor, and/or telescoping linear actuator. Such an actuator can also be used in series in some examples to achieve a quick, short displacement stage and a slower, large displacement stage.

A sanding end effector 160S can include sensors 366 and/or a vision system 364 to ensure the desired orientation of the sanding head 1105 relative to the wall, while ignoring defects to be sanded to the datum plane. One example application can be to ensure planarity of the sanding head 1105 to the wall; however, the sanding head 1105 can also be set an angle to the target surface. The planarity can be established by utilizing the sensors 366 and/or a vision system 364 to detect the plane of the surface and then match the position of the sanding head 1105 using the degrees of freedom of the base unit 120, robotic arm 140 and/or end effector 160. The planarity can also be established by utilizing a vision system 364 at the end effector 160, or a set of proximity, range, or contact sensors 366 to establish the position of the sander head 1105 relative to the wall. The orientation of the sander 1010 can be controlled directly by the setting the joint angles of the robotic arm 140, by a powered gimbal or joint at the end effector 160, by a portion of the base unit 120, or by a passive gimbal that allows the sanding head 1105 to tip and tilt relative to the end of the robotic arm 140. A passive gimbal can enable the sanding head 1105 to follow the plane of the surface despite errors in the position of the base unit 120, robotic arm 140 and/or end effector 160.

In another embodiment, the position of the sanding head 1105 can be controlled through an active gimbal of the end effector 160 using feedback from one or more of the sensors 326, 346, 366 and/or vision systems 324, 364 that establish the relative orientation between sanding head 1105 and sanding surface. A powered or passive gimbal or end effector degrees of freedom can be encoded such that the orientation of the sanding head 1105 is known to the system 100. The sanding end effector 160S can also utilize outriggers such as rollers to use adjacent surfaces or raised edges as datums to guide sanding and achieve accurate corners. These rollers can be instrumented to measure force, contact, proximity, or the like, or passively make contact while the system 100 utilizes sensing (e.g., force and torque sensing) to maintain a pressure or force against the datum surface. The information about sanding head orientation relative to the robotic arm 140 can be used to alter the toolpath, tool parameter and/or system configuration to ensure the automated drywalling system 100 can carry out the sanding process without running into limitations of the hardware. The gimbal of an end effector 160 can be mounted in series with a force stage to allow for the sanding head 1105 to be able to tip, tilt and move normal to the target surface.

In both passive and active embodiments of a gimbal of an end effector 160, the angular position of the gimbal can be recorded to locate and establish the plane of the target surface. The angular position of the gimbal can be recorded using one or more sensors 326, 346, 366 and/or vision systems 324, 364, which can include, but are not limited to, encoders on a rotary axis, laser range finders, capacitance sensors, IMUs, an external vision system, sonar sensors, potentiometers, motor loads, or any combination of these. The gimbal system can be tuned to minimize dynamic effects by using springs, dampers or a combination of these. The gimbal system can be designed to minimize the distance between the sanding surface of a sanding head 1105 and the tip and tilt axes. In one embodiment, the tip-tilt pivot points are mounted on a ring with a diameter greater than that of the sanding head 1105, enabling for the pivots to be on the same plane as or as near as possible to the sanding surface.

Figure 13:
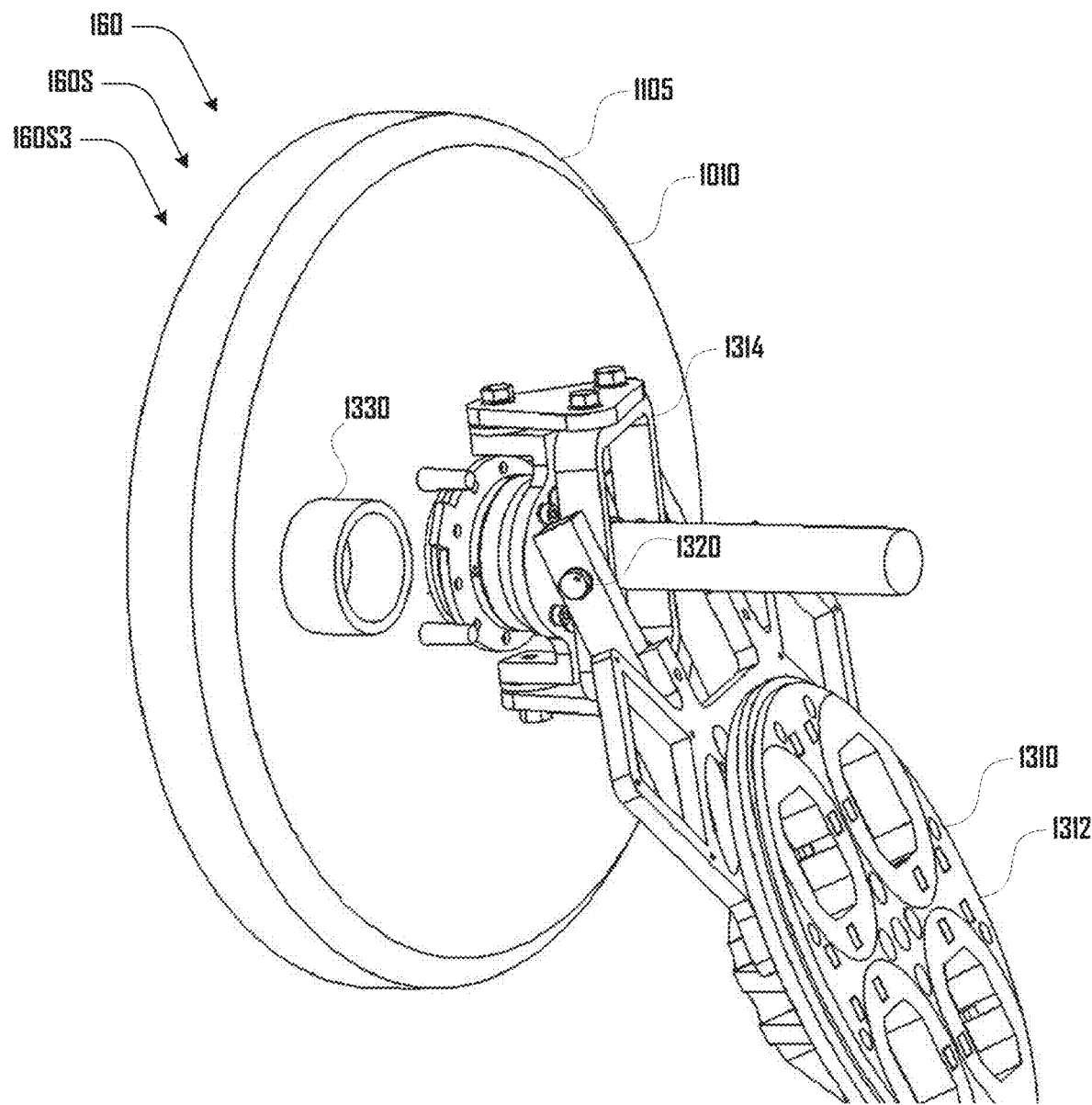
FIG. 13 illustrates a further example embodiment of a sanding end effector with a passive gimbal that comprises a first and second section, which are coupled via a rotatable joint.

FIG. 13 illustrates an example embodiment 160S3 of a sanding end effector 160S with a passive gimbal 1310 that comprises a first and second section 1312, 1314, which are coupled via a rotatable joint 1320. The gimbal 1310 is coupled to a sanding head 1105, which includes a vacuum port 1330, which can couple with an end 424E of a vacuum line 424 that provides a vacuum generated by a vacuum source 422 (see FIG. 4).

Figure 14:
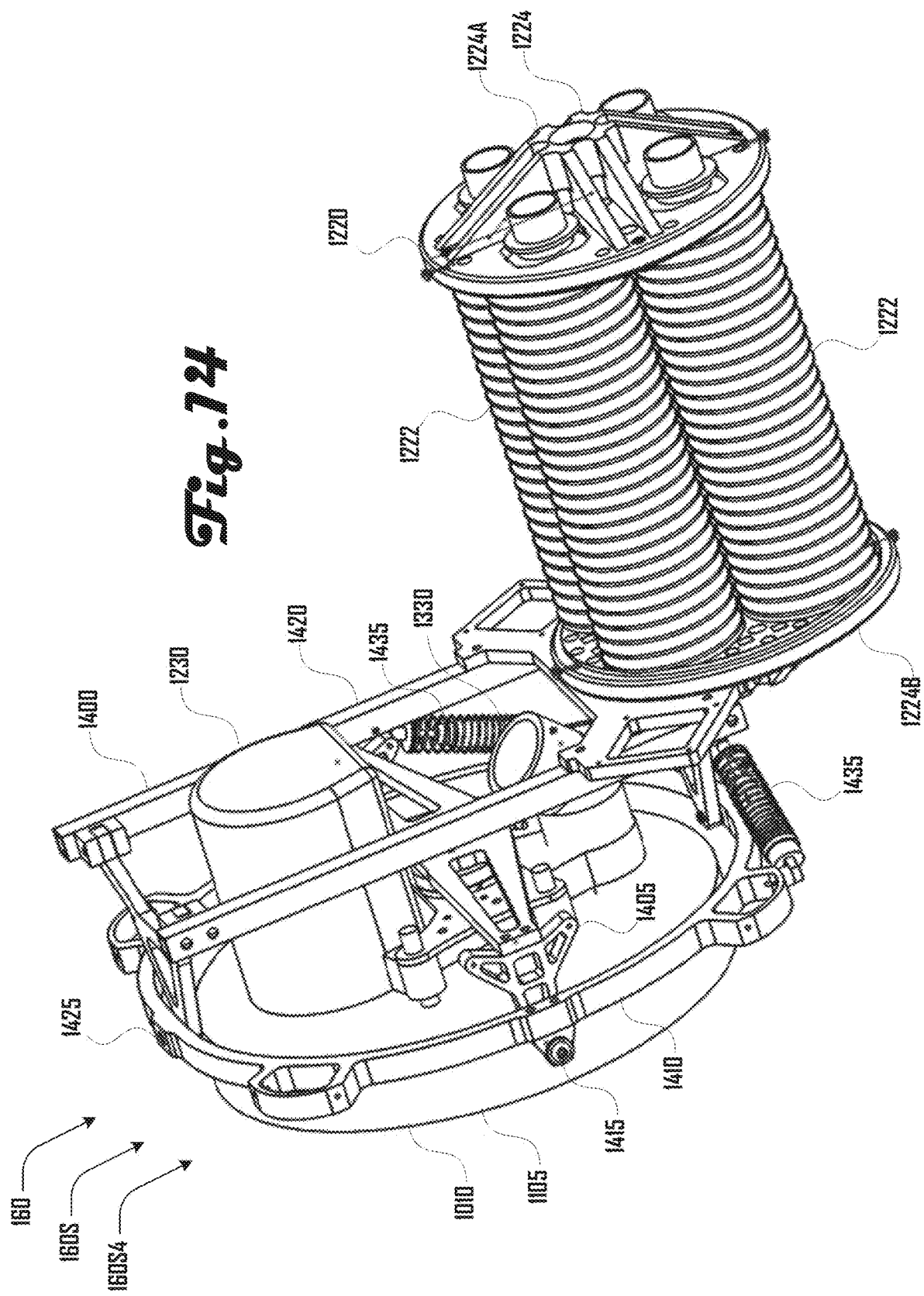
FIG. 14 illustrates yet another example embodiment of a sanding end effector where a sanding head is mounted on a gimbal which is mounted in series with a force limiting bellows stage assembly that comprises of four bellows disposed between a pair of mounting plates.
Figure 15:
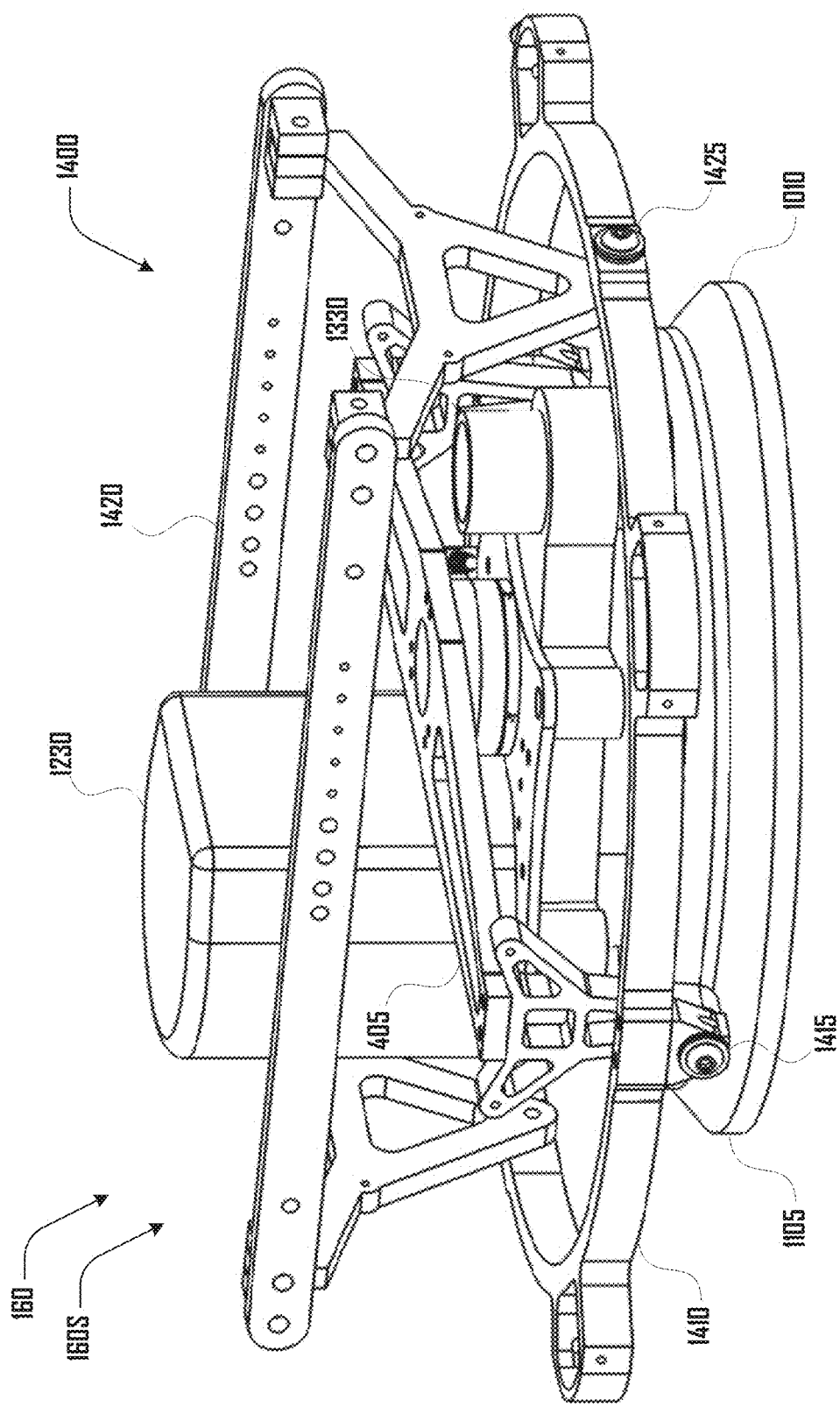
FIG. 15 illustrates a close up view of the gimbal of FIG. 14.

FIG. 14 illustrates an example embodiment 160S4 of a sanding end effector 160S where a sanding head 1105 is mounted on a gimbal 1400 which is mounted in series with a force limiting bellows stage assembly 1220 that comprises of four bellows 1222 disposed between a pair of mounting plates 1224.

Figure 16:
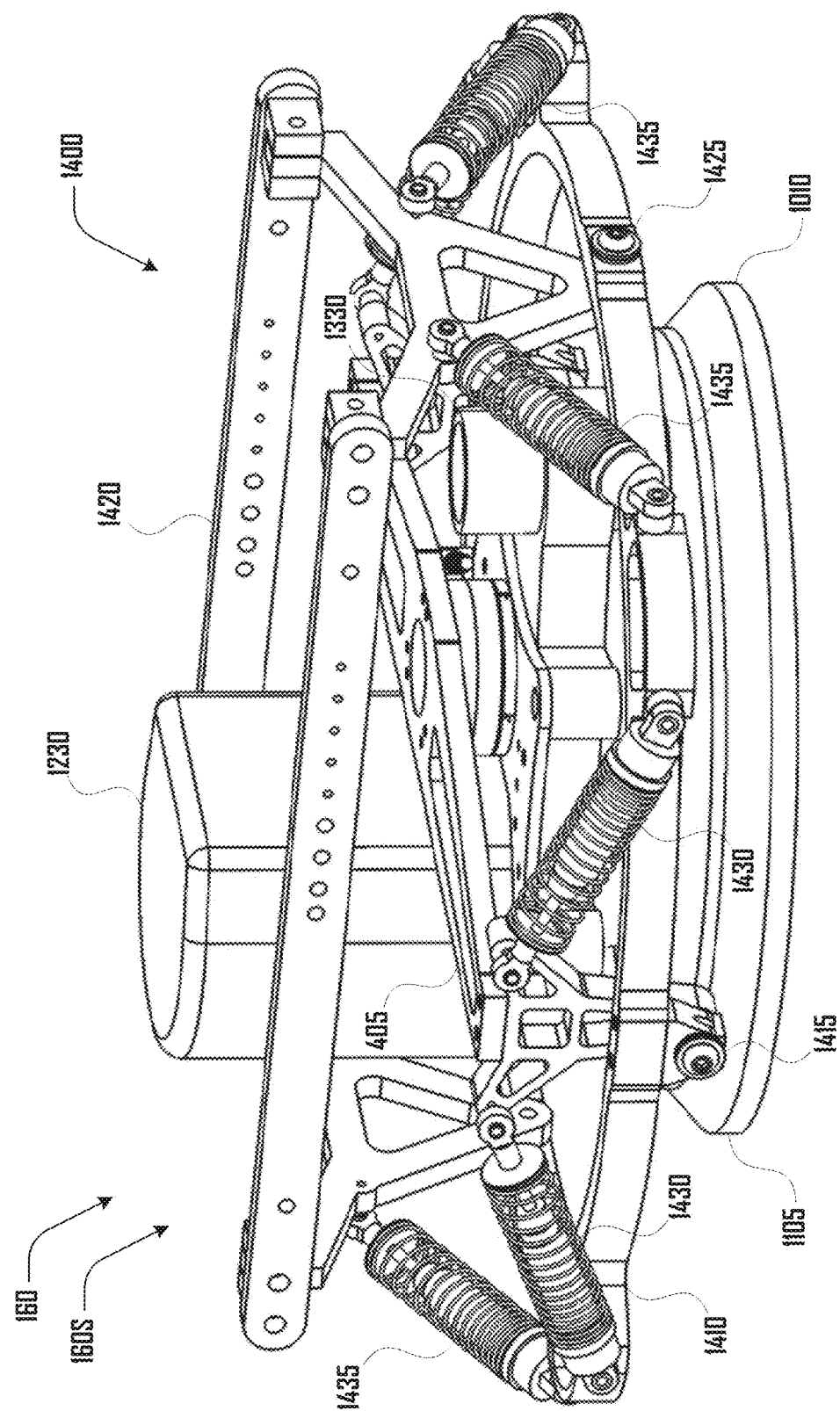
FIG. 16 illustrates a close of view of the gimbal of FIGS. 13 and 14 including damper-spring assemblies.
Figure 17:
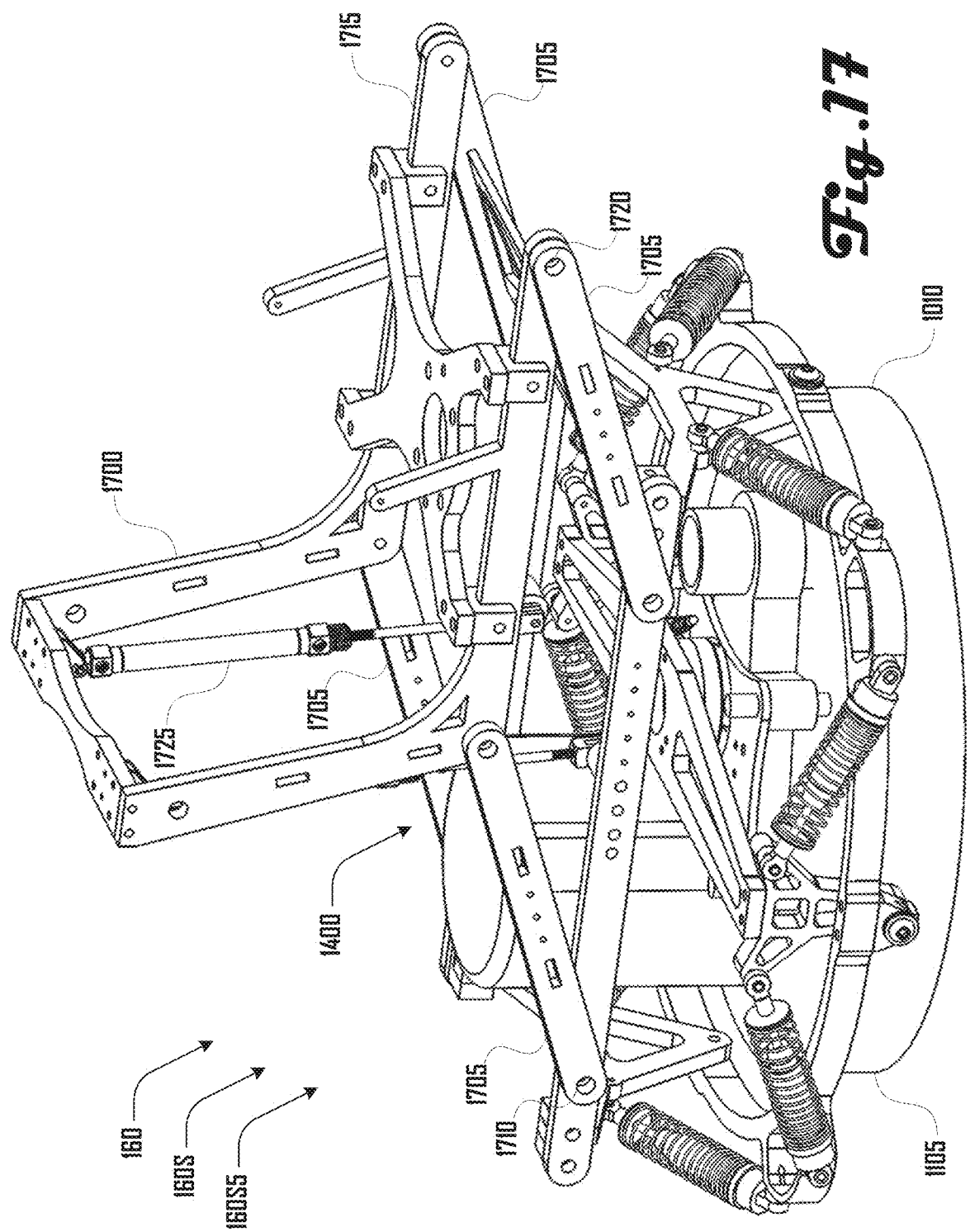
FIG. 17 illustrates an example embodiment of a sanding end effector including the gimbal of FIGS. 13-16.

As shown in FIGS. 14-17, the gimbal 1400 can comprise a first bar assembly 1405 that is coupled to the sanding head 1105 of the sander 1010. The first bar assembly 1405 is coupled to a gimbal ring 1410 via a plurality of first pivots 1415. A second bar assembly 1420 is coupled to the gimbal ring 1410 via a plurality of second pivots 1425. As shown in FIGS. 14, 16 and 17, a first set of spring-damper assemblies 1430 are coupled between the first bar assembly 1405 and the gimbal ring 1410 and a second set of spring-damper assemblies 1435 are coupled between the second bar assembly 1420 and the gimbal ring 1410. In various embodiments, the gimbal 1400 can be tuned to minimize dynamic effects by using springs, dampers or a combination of these (e.g., spring-damper assemblies 1430, 1435).

In various embodiments, the gimbal 1400 allows the sanding head 1105 to tip and tilt relative to the end distal end 144 of the robotic arm 140. The gimbal 1400 can be designed to minimize the distance between the sanding surface of the sanding head 1105 and tip and tilt axes by having the pivot points 1415, 1425 on the gimbal ring 1410 with a diameter of the gimbal ring 1410 being greater than the diameter of the sanding head 1105.

FIG. 17 illustrates another example embodiment 160S5 of a sanding end effector 160S where the sanding head 1105 mounted on the gimbal 1400 which can be used to control the tip and tilt of the sanding head 1105 relative to a target surface. The gimbal 1400 is mounted in series to a linear four-bar stage assembly 1700 via a set of linkages 1705 coupled to the second bar assembly 1420 via a third pivots 1710, with the linkages 1705 coupled to a stage 1715 via fourth pivots 1720. In various embodiments, the stage assembly 1700 limits, sets or controls the applied normal force using one or more pneumatic cylinders 1725 whose pressure can be controlled by the system 100 via a regulator or valve and a pressure sensor. The four-bar stage assembly 1700 can restrict the rotation of the gimbal 1400 relative to the second end 144 of the robotic arm 140. The position of the linear stage assembly 1700 and tip-tilt angles of the gimbal 1400 can be recorded using displacement and angular sensors, and the like.

FIG. 18 illustrates a further embodiment 160S6 of a sanding end effector 160S where the sanding head 1105 is mounted in series with a one or more linear actuators 1810 that are used to control tip and tilt of the sanding head 1105 relative to a target surface and/or the normal position and applied force of the sanding head 1105. For example, the system 100 can individually control each of the actuators 1810 to move the sanding head 1105 as desired. The linear actuators 1810 can extend from a mounting flange 1820. In various embodiments, the linear actuators can comprise pneumatic cylinders 1810.

In embodiments with more than one sanding head 1105, all sanding heads 1105 can be mounted on a single gimbal structure or each head or multiple heads 1105 can be mounted on separate gimbals. Mounting the heads 1105 or group of heads 1105 on separate gimbals can allow for a sanding head surface plane to be set, limited, guided by the surface, or controlled separately. A multiple sanding head tool with each head 1105 on a separate gimbal can allow for each head to follow the target surface passively or actively to achieve the desired planarity and finish. The sanding head 1105 can be mounted on a gimbal in series with a compliant system described above that limits, sets, or controls the force applied on the surface.

In some embodiments, the sanding end effector 160S can include a vacuum and dust collecting system. For example, FIG. 19 illustrates one example embodiment 160S7 of a sanding end effector 160S that includes a vacuum system 472 with a vacuum hood 1920 surrounding a sanding head 1105. The vacuum hood 1920 can be coupled to a vacuum line 424 via a vacuum port 1330 on the vacuum hood 1920. The vacuum line 424 can be coupled to a vacuum source 422 (see FIG. 4), which can collect dust and other particles are produced during sanding via the sanding head 1105.

FIG. 20 illustrates a further embodiment 160S8 of a sanding end effector 160S having a vacuum system 472 where the sanding head 1105 is trailed by a vacuum nozzle 2005, which can include a brush, sponge, foam, or the like. Such a flexible surface can helps pick up the dust and debris left on the surface after sanding via the sanding head 1105. The sanding head 1105 can also be at least partially surrounded by a shroud 2010 that can prevent dust or debris from moving away from the immediate vicinity of the sanding head 1105, which can allow such debris to be picked up via the vacuum nozzle 2005. The vacuum nozzle 2005 can coupled to an end 424E of a vacuum line 424 that can be coupled to a vacuum source 422 (see FIG. 4).

In some embodiments, the sander head 1105 or other end effector portion can be surrounded by a vacuum hood 1910 as shown in FIG. 19 that uses negative pressure to suction the dust or debris generated by sanding via the sanding head 1105. In some embodiments, the sanding head 1105 and sanding pad can also have holes or pores to allow for the negative pressure to be applied directly on a sanding surface. In some examples, the vacuum system 472 can use a filter to ensure that particles are captured. HEPA filters can be used in some embodiments. The collected material can be recycled. A sensor can be mounted on or about the automated drywalling system 100 to monitor air quality and particulate matter. The system 100 can trigger an alarm when unsafe air quality is detected. The magnitude of the negative pressure or vacuum can be controlled as a way to control the normal force applied by the sanding head 1105 on the target surface. The sanding end effector 160S can also have a trailing brush, sponge, wiper, vacuum port or any combination of these to help collect dust that is on the surface. The vacuum system 472, vacuum source 422, or the like, can be monitored to detect clogs or when the system is full. Clogs can be detected by monitoring the motor load, air flow, or vacuum reading. The amount of material in a collection system can be monitored by weight of the system, time in operation, visual sensors, or the like.

The automated drywalling system 100 can use vision systems 324, 364 and/or sensors 326, 346, 366 to establish the condition of the wall before and/or after sanding to determine the appropriate toolpaths and tool parameters for sanding. The system 100 can use elements including, but not limited to computer vision, structured lights, stereo cameras, images, lights and shadows, LIDAR, radar, sonar, point clouds or any combination of these to establish the conditions of the surface. Detecting or determining such conditions can include establishing a plane relative to the system 100 or another surface, detecting high or low points, curvature, and defects. The one or more vision system 324, 364 can be used to create a topographical map of a target surface to identify high and low spots. The map can be created after drywall 610 or other suitable substrate has been coated. The map can also be an input from the automated drywalling system 100 generated by the system 100 during application of joint compound 630 by the system 100, and such a map can that specify the joint compound thickness and profile applied to the surface at each location. The map can be updated by the one or more vision system 324, 364 as the system 100 is moved around the room. The system 100 can also utilize rollers, proximity sensors, contact sensors, and profilometers, and the like, to measure the profile of the surface. The base unit 120, robotic arm 140, and/or end effector 160 can be used to make contact with rollers or other mechanism on an encoded linear stage and can then move these over the surface creating a topographical map. This can be done over joints or seams 620 to determine the profile. The system 100 can then compute how the mud 630 should be sanded by the sanding end effector 160 to create a visually flat wall.

In some embodiments, the joint compound 630 can have a prescribed coloring or additives that when sanded change colors, which can facilitate the detection of areas that have not been sanded yet. The system 100 can also work with joint compound 630 that has been applied in layers with different colors to establish how much joint compound 630 has been removed at each point. A sanding model with inputs from the end effector 160, including motor load, sanding speed, grit, material collected by the vacuum system, contact forces, tool orientation, and the, can also be used to estimate the joint compound 630 removed at each point. Capacitance, radar, resistance, and sonar measurements can also be used to establish the thickness of the joint compound 630 in some examples. Lights can be mounted on the sanding head 1105 or other suitable portion of a sanding end effector 160S or externally to illuminate the surface or system 100 enabling the detection of high and low points, tool marks, and defects using one or more vision systems 324, 364 and/or sensors 326, 346, 366. The sanding end effector 160S can also utilize a feedback mechanism for communicating contact, forces, gimbal displacement information, tool orientation, motor loads, and finish quality to the automated drywall system 100 (e.g., a planner running on the control system 322) for the purpose of real time updating of the tool paths and tool parameters for improving finish. The system 100 can use tool position and orientation, captured surface conditions and models to update the robotic toolpaths to ensure that the desired contact is maintained during sanding. The system 100 can also determine areas that need another sanding pass, rework using the automated drywalling system 100, or rework to be done manually by the user. The user can also use a user interface to indicate areas that the user has identified as needing rework. The planner can use this input along with other information about the previous work to create a new toolpath or tool parameter. Both user and system feedback can be fed into a machine learning algorithm to create a better model for sanding future surfaces given a set of initial conditions.

The automated drywalling system 100 can utilize a user interface to enable a worker to control, program, debug, plan, and setup the system 100. The user interface can be used to give the user information of all the steps that must be taken to setup the system 100. Each step can be checked off when complete and the user can request more information on each step. The workspace of the system 100 can be shown overlaid on the camera feed or projected onto the target surface to help the user position the base unit 120, robotic arm 140, and/or end effector 160. The workspace can be projected using lights, lasers or the like. The system 100 can also automatically perform certain steps and the user interface can report the progress of each step, as well as give guidance to the steps the user must follow to perform a task. The user interface can be used to setup the system 100 and run any calibration routines required. The interface can also be used to plan the job including detecting wall, user definition of path parameters or path itself, auto generation of the tool path, user input of tool parameters, and automatically optimized tool parameters given a set of user inputs.

The user interface can be a graphical user interface and include a 2D or 3D representation of the worksite and workspace. The representation can include camera feeds as well as computer models and reconstructions created using sensor data. The interface can overlay paths, quality visuals, progress, robot model, or the like, over the camera or workspace models. As the task is completed, the path can be highlighted in different colors or with different style lines to indicate completion, quality achieved, problem areas, and the like.

Any problems, issues, or bugs can be reported in the user interface. Lights on the base unit 120, robotic arm 140, and/or end effector 160 as well as sounds can also be used to indicate problems; base unit 120, robotic arm 140, and/or end effector 160 being in motion; work is in progress; system 100 is on or off; toolpath is running or paused; system 100 needs attention or materials, and any other indicators of the system state. The user interface can also display information on the progress, task and tool parameters, and quality metrics of the task being performed. Environmental conditions can also be displayed and recorded by the interface. The system 100 can indicate to the user what steps to take to correct or improve conditions including air quality, temperature, humidity, and the like. If the system 100 detects unsuitable or unsafe conditions it can display a message warning the user and providing guidance on next steps. The system 100 can use an optimization to find what parameters could be used to improve the process including reducing work time, increasing quality, and minimizing material usage among others. The user interface can also create reports on the tasks executed, quality metrics, environmental conditions, completion and performance logs, and the like. Information can include robot workspace, tool paths, progress, sequence of approach, removal rates and thicknesses, sanding forces, coverage record, path speed, tracking error, time to complete the task, tool time, setup time, vacuum waste material collected, cleaning time, and the like.

The user can interface with the system 100 using a computer, tablet, touch screen, mobile device, pendant, joystick, controller, or buttons directly on the system 100. The worker can also position and train the base unit 120, robotic arm 140, and/or end effector 160 by directly moving the base unit 120, robotic arm 140, and/or end effector 160. The user interface, controller, or buttons can be used to record positions as well as change the control mode and task.

An augmented reality system can be used to show the worker the toolpath plan generated by the system 100, instructions, original BIM or plan, or a combination of these. The augmented reality can be displayed using a headset, smart goggles, projections, or the like. The worker can be shown areas that require manual sanding or coating application. The user can also overlay the location of studs, framing, pipes, ducts, electrical system behind the board to facilitate finishing. The sanding tools both manual and automated can be tracked in the map using tags, IMUs, or other sensors and a warning can be given to the operator if an attempt is made to sand in an erroneous position or under the wrong tool settings. The system 100 or tools can also utilize radar, sonar, thermal imaging to establish what is behind the substrate.

The automated drywalling system 100 can also produce a visualization, paths, or instructions or a combination of these to guide the user in completing manual work. The visualization can include 2D or 3D maps marking the areas of work with labels. The visualization system can also include a projection of the plan onto the target surface this can be done with a laser system, projector or through augmented reality headset or goggles worn by the user.

The automated drywalling system 100 can include humidity, temperature, air flow sensors, or the like to establish the environmental conditions for the task. The automated drywalling system 100 can be fed information on the conditions under which the coating material (e.g., joint compound 630) dried, cured or set, which can be used to estimate the characteristics of the coating including hardness. The automated drywalling system 100 can also use a sensor or test sand to determine the hardness of the material. These inputs can be used to set a sander toolpath, sander parameters or other sander settings. The environmental information in conjunction with the joint compound parameters can be used to determine or estimate drying and setting times for the mud 630 indicating when the sanding should begin. The system 100 can also determine when the joint compound 630 has set and dried by measuring the moisture content, thermal conductivity of the covered seam 620, using vision systems 324, 364 and/or sensors 326, 346, 366, including, but not limited to a thermal imaging camera or thermometer (contact or non-contact), and detecting differences in colors using a camera. The thermal measurements can be used to infer the moisture content by comparing the temperature of the joint compound 630 to the surrounding materials (e.g., drywall board 610). In some embodiments, as water or other solvent evaporates from the mixture of joint compound 630, the temperature of the compound 630 can be lower than that of the surrounding materials. Models of the joint compound drying process can also be used to estimate the time to dry or cure given a set of starting conditions and information about the environment. Vision systems 324, 364 and/or sensors 326, 346, 366 (e.g., environmental sensors) can be used in conjunction with an HVAC system or heater, air conditioner, fans, or the like, to control the room conditions. The sensor and/or vision readings can trigger any such environmental control systems, or a combination thereof, to maintain the room at the desired conditions for quality, reduced drying time, or comfort of the operator.

The sanding time, sander rotational speed, motor torque and load, force applied, and the like, can also be tracked to inform when sanding paper or other sanding element should be cleaned or changed. The sandpaper wear model can also take as an input the type of material being sanded, the conditions under which it was applied, conditions under which it dried, was set or cured. The vision systems 324, 364 and/or sensors 326, 346, 366 can be used to detect finish and establish if the pad needs to be changed. The user interface can display the wear on the sanding pad and alert the user when the disk needs to be changed. The automatic drywalling system 100 can also include an automatic station that allows the system 100 to replace sanding pads or belts. The station can be run without any human intervention or as a collaboration between the system 100 and the user. The sanding material can be held using and suitable coupling system, including but not limited to, hook and loop system, adhesive, mechanical interlock, vacuum, magnets, electrostatic forces, or any combination of these. The sanding station can control the mechanism that holds the sanding material in order to change the pad, the station can also use a blade to peel the sanding material off the tool, or the station can use a solvent to remove an adhesive.

The system 100 can generate reports and interface with other software platforms including BIM packages. Reports can be created that can be used for inspection and certification. A report can be customized to provide the information required to pass a standard, test, or certification. The reporting system can also provide a live update of the current task progress and live camera feed. This information can be used to help track asset performance and work progression. The data can be reported to a BIM system or other software to facilitate planning of other trades, next steps, or schedule inspections or other tasks. The reports can include full maps of the work done and tool and path parameters utilized to complete the task. Further images or video can be recorded to facilitate quality checks or for tracking of issues. The system 100 can record parameters used to complete the task which can be fed to a machine learning software to enable the system 100 to learn from past work. The reports can also be used to optimize workflow and scheduling. The system's optimization function can be updated to meet the desired needs including minimizing task time, completion of the task in a part of the worksite to allow other trades to come in, minimizing cost, optimal use of assets and workforce, among others. The system's reports can also include information on environmental conditions and how the process was changed given the conditions.

The automated drywalling system 100 can create a report that shows the process parameters that were used to sand the surface as well as the order of operations. The report can include BIM, 3D and 2D maps or plans, images, video, and the like. The maps provided by the system 100 can be used to facilitate repairs and maintenance by providing the customer with the location of components behind the wall as well as the location of seams 620 to facilitate the removal of panels or boards.

The updated room models that reflect the as-built conditions and measurements can be exported for use in priming and painting the walls or for certification of quality at delivery. The automated sanding system can work in conjunction with a larger system that plans the full process from mapping a room, to cutting and hanging the drywall to finishing and painting of the surfaces.

Although various examples herein relate to sanding of drywall pieces 610 which have been coated at least in part with joint compound 630, it should be clear that the present disclosure can pertain to an automated sanding systems and methods for finishing various suitable substrates that have been covered with joint compound, plaster, stucco or any other type of coating. The sanding systems and methods discussed herein can also be used to finish cement, plaster, stucco, metal, polymer, wood surfaces and the like. Also, while examples discuss mud or joint compound, the system 100 can be used for finishing surfaces with any suitable material including, plaster, stucco, cement, paint or any combination of these. The system 100 can also be used for polishing or grinding, surface preparation for coatings, removing coatings or oxidation like rust, and the like.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. An automated drywalling system for sanding joint compound applied to drywall of a wall assembly, the automated drywalling system comprising:
   a base unit that includes:
      a platform,
      a cart configured to be disposed on and move on the ground, and
      a lift disposed between the platform and cart, the lift configured to raise the platform up and down;
   an elongated robotic arm that extends between a base end and a distal end, the robotic arm coupled to the base unit on the platform at the base end of the robotic arm;
   a sanding end effector coupled at the distal end of the robotic arm, the sanding end effector including:
      a sanding head configured for sanding a target surface,
      an end effector linear actuator mechanism for tracking of surface contours of the target surface by the sanding head, applying constant normal force to the target surface by the sanding head, and compensating for errors in the positioning of the sanding head relative to the target surface via a stroke of the linear actuator mechanism, the end effector linear actuator mechanism including a sensor for monitoring the stroke of the end effector linear actuator mechanism; and
      a guiding element configured to engage the target surface or adjacent portion of a wall assembly to guide the sanding end effector in sanding the target surface;
   one or more vision systems;
   one or more sensors;
   a computing device executing a computational planner that:
      obtains target surface data from the one or more vision systems and the one or more sensors, the target surface data including information regarding a configuration of a wall assembly including a plurality of drywall pieces disposed on the wall assembly forming one or more joints between respective drywall pieces and having joint compound applied to the one or more joints;
      automatically generates instructions for driving the sanding end effector, robotic arm, and base unit to perform at least one sanding task that includes the sanding end effector at least sanding joint compound applied to the one or more joints, the generating based at least in part on the target surface data;
      automatically drives the sanding end effector, robotic arm, and base unit to perform the at least one sanding task; and
      automatically updates tool paths and tool parameters of the sanding end effector based at least in part on a feedback mechanism, including the sensor for monitoring the stroke of the end effector linear actuator mechanism, to provide for a desired contact being maintained between the sanding head and the target surface during the at least one sanding task.

2. The automated drywalling system of claim 1, wherein the generating instructions for driving the sanding end effector, robotic arm, and base unit to sand joint compound of the one or more joints between the respective drywall pieces is further based on at least one of:
    data obtained while the automated drywalling system was applying joint compound to the one or more joints between respective pieces of drywall; and
    data obtained while the automated drywalling system was hanging the drywall pieces on the wall assembly.

3. The automated drywalling system of claim 1, wherein the sanding end effector further comprises a vacuum hood disposed around at least a portion of the sanding head to capture sanding debris generated by the sanding head sanding joint compound of the one or more joints between the respective drywall pieces, the vacuum hood coupled to a vacuum line that extends via the robotic arm to a vacuum source disposed at the base unit, the vacuum source generating a vacuum at the vacuum hood via the vacuum line.

4. The automated drywalling system of claim 1, wherein the sanding end effector further includes a powered active gimbal configured to set a tip-tilt angle of the sanding head, the powered active gimbal comprising:
    a gimbal structure having a greater circumscribed diameter than a maximum diameter of the sanding head;
    a first bar assembly coupled to the sanding head, the first bar assembly coupled to the gimbal ring via a plurality of first pivots;
    a second bar assembly coupled to the gimbal ring via a plurality of second pivots;
    a first set of spring-damper assemblies coupled between the first bar assembly and the gimbal structure; and
    a second set of spring-damper assemblies coupled between the second bar assembly and the gimbal structure.

5. The automated drywalling system of claim 1, wherein the sanding end effector further includes a force limiting stage assembly that comprises one or more pneumatic springs configured to allow the sanding head to move relative to the distal end of the robotic arm to limit force applied to the target surface.

6. An automated drywalling system comprising:
    a base unit;
    an elongated robotic arm that extends between a base end and a distal end, the robotic arm coupled to the base unit at the base end of the robotic arm;
    a sanding end effector coupled at the distal end of the robotic arm, the sanding end effector configured to sand joint compound on a target surface and including an end effector actuator mechanism for at least one of tracking of surface contours of the target surface by the sanding end effector, applying a selected normal force to the target surface by the sanding head, and compensating for errors in the positioning of the sanding end effector relative to the target surface via a stroke of the actuator mechanism, the end effector actuator mechanism including a sensor for monitoring the stroke of the end effector actuator mechanism;
    one or more vision systems; and
    a computing device executing a computational planner that:
        obtains target surface data from the one or more vision systems, the target surface data including information regarding a configuration of a wall assembly including a plurality of drywall pieces disposed on the wall assembly forming one or more joints between respective drywall pieces having joint compound applied thereon;
        automatically generates instructions for driving the sanding end effector, robotic arm, and base unit to perform at least one sanding task that includes the sanding end effector at least sanding the applied joint compound associated with the one or more joints between the respective drywall pieces, the generating based at least in part on the target surface data;
        automatically drives the end effector, robotic arm, and base unit to perform the at least one sanding task; and
        automatically updates at least one of tool paths and tool parameters of the sanding end effector based at least in part on a feedback mechanism, including the sensor for monitoring the stroke of the end effector actuator mechanism, to provide for a desired contact being maintained between the sanding end effector and the target surface during the at least one sanding task.

7. The automated drywalling system of claim 6, wherein the generating instructions for driving the sanding end effector, robotic arm, and base unit to sand joint compound of the one or more joints between the respective drywall pieces is further based on data obtained while the automated drywalling system was applying joint compound to the one or more joints between respective pieces of drywall.

8. The automated drywalling system of claim 6, wherein the sanding end effector further comprises a vacuum hood disposed around at least a portion of the sanding head to capture sanding debris generated by the sanding head sanding joint compound of the one or more joints between the respective drywall pieces.

9. The automated drywalling system of claim 6, wherein the sanding end effector further includes a gimbal that comprises:
    a gimbal structure having a greater circumscribed diameter than a diameter of the sanding head;
    a first bar assembly coupled to the sanding head, the first bar assembly coupled to the gimbal ring via a plurality of first pivots; and
    a second bar assembly coupled to the gimbal ring via a plurality of second pivots.

10. The automated drywalling system of claim 9, wherein the gimbal further comprises:
    a first set of spring-damper assemblies coupled between the first bar assembly and the gimbal ring; and
    a second set of spring-damper assemblies coupled between the second bar assembly and the gimbal ring.

11. The automated drywalling system of claim 9, wherein the gimbal comprises a powered active gimbal configured to set a tip-tilt angle of the sanding head.

12. The automated drywalling system of claim 6, wherein the sanding end effector further includes a force limiting stage assembly that comprises a one or more pneumatic springs configured to allow the sanding head to move relative to the distal end of the robotic arm to limit force applied to the target surface.

13. The automated drywalling system of claim 6, wherein the sanding end effector further includes a guiding element configured to engage the target surface or adjacent portion of a wall assembly to guide the sanding end effector in sanding the target surface.

14. An automated sanding system comprising:
a positioning stage that extends between a base end and a distal end;
a sanding end effector coupled at the distal end of the positioning stage, the sanding end effector configured to sand a target surface and including an end effector actuator mechanism for at least one of tracking of surface contours of the target surface by the sanding end effector, applying a desired normal force to the target surface by the sanding head, and compensating for errors in the positioning of the sanding end effector relative to the target surface via a configuration of the actuator mechanism, the end effector actuator mechanism including a sensor for monitoring the configuration of the end effector actuator mechanism; and
a computing device executing a computational planner that:
generates instructions for driving the sanding end effector and positioning stage to perform at least one sanding task that at least includes the sanding end effector sanding a target surface, the generating based at least in part on obtained target surface data;
drives the end effector and robotic arm to perform the at least one sanding task; and
updates at least one of tool paths and tool parameters of the sanding end effector based at least in part on a feedback mechanism, including the sensor for monitoring the configuration of the end effector actuator mechanism, to provide for a desired contact being maintained between the sanding end effector and the target surface during the at least one sanding task.

15. The automated sanding system of claim 14, wherein the positioning stage comprises a robotic arm.

16. The automated sanding system of claim 14, wherein the sanding end effector further comprises a vacuum hood disposed around at least a portion of the sanding head to capture sanding debris generated by the sanding of the target surface.

17. The automated sanding system of claim 14, wherein the sanding end effector further includes a gimbal that comprises:
a gimbal structure;
a first bar assembly coupled to the sanding head, the first bar assembly coupled to the gimbal ring via one or more first pivots; and
a second bar assembly coupled to the gimbal ring via one or more second pivots.

18. The automated sanding system of claim 14, wherein the sanding end effector further includes a force limiting stage assembly that comprises one or more pneumatic springs configured to allow the sanding head to move relative to the distal end of the robotic arm to limit force applied to the target surface.

19. The automated sanding system of claim 18, wherein the force limiting stage assembly comprises a plurality of linear guides that constrain the sanding head rotating relative to a mounting flange opposing the sanding head.

20. The automated drywalling system of claim 14, wherein the sanding end effector further includes a guiding element configured to engage the target surface to guide the sanding end effector in sanding the target surface.

* * * * *

UNITED STATES PATENT AND TRADEMARK OFFICE
CERTIFICATE OF CORRECTION

PATENT NO. : 10,718,119 B2
APPLICATION NO. : 15/942318
DATED : July 21, 2020
INVENTOR(S) : Maria J. Telleria et al.

It is certified that error appears in the above-identified patent and that said Letters Patent is hereby corrected as shown below:

In the Claims

Column 22, Line 15, cancel the text beginning with "1. An automated drywalling" to and ending "one sanding task." in Column 23, Line 4 and insert the following claim:
--1. An automated drywalling system for sanding joint compound applied to drywall of a wall assembly, the automated drywalling system comprising:
    a base unit that includes:
        a platform,
        a cart configured to be disposed on and move on the ground, and
        a lift disposed between the platform and the cart, the lift configured to raise the platform up and down;
    an elongated robotic arm that extends between a base end and a distal end, the robotic arm coupled to the base unit on the platform at the base end of the robotic arm;
    a sanding end effector coupled at the distal end of the robotic arm, the sanding end effector including:
        a sanding head configured for sanding a target surface,
        an end effector linear actuator mechanism for tracking of surface contours of the target surface by the sanding head, applying constant normal force to the target surface by the sanding head, and compensating for errors in positioning of the sanding head relative to the target surface via a stroke of the end effector linear actuator mechanism, the end effector linear actuator mechanism including a sensor for monitoring the stroke of the end effector linear actuator mechanism; and
        a guiding element configured to engage the target surface or adjacent portion of a wall assembly to guide the sanding end effector in sanding the target surface;
    one or more vision systems;
    one or more sensors;
    a computing device executing a computational planner that:
        obtains target surface data from the one or more vision systems and the one or more sensors, the target surface data including information regarding a configuration of the wall assembly including a plurality of drywall pieces disposed on the wall assembly forming one or more joints between respective drywall pieces and having joint compound applied to the one or more joints;

Signed and Sealed this
Sixth Day of December, 2022

*Katherine Kelly Vidal*
Katherine Kelly Vidal
*Director of the United States Patent and Trademark Office* automatically generates instructions for driving the sanding end effector, the robotic arm, and the base unit to perform at least one sanding task that includes the sanding end effector at least sanding the joint compound applied to the one or more joints, the generating based at least in part on the target surface data;
automatically drives the sanding end effector, the robotic arm, and the base unit to perform the at least one sanding task; and
automatically updates tool paths and tool parameters of the sanding end effector based at least in part on a feedback mechanism, including the sensor for monitoring the stroke of the end effector linear actuator mechanism, to provide for a desired contact being maintained between the sanding head and the target surface during the at least one sanding task.--

Column 23, Line 5, cancel the text beginning with "2. The automated drywalling" to and ending "the wall assembly." in Column 23, Line 14 and insert the following claim:
--2. The automated drywalling system of claim 1, wherein the generating instructions for driving the sanding end effector, the robotic arm, and the base unit to sand the joint compound of the one or more joints between the respective drywall pieces is further based on at least one of:
data obtained while the automated drywalling system was applying the joint compound to the one or more joints between respective drywall pieces; and
data obtained while the automated drywalling system was hanging the drywall pieces on the wall assembly.--

Column 23, Line 15, cancel the text beginning with "3. The automated drywalling" to and ending "the vacuum line." in Column 23, Line 23 and insert the following claim:
--3. The automated drywalling system of claim 1, wherein the sanding end effector further comprises a vacuum hood disposed around at least a portion of the sanding head to capture sanding debris generated by the sanding head sanding the joint compound of the one or more joints between the respective drywall pieces, the vacuum hood coupled to a vacuum line that extends via the robotic arm to a vacuum source disposed at the base unit, the vacuum source generating a vacuum at the vacuum hood via the vacuum line.--

Column 23, Line 24, cancel the text beginning with "4. The automated drywalling" to and ending "the gimbal structure." in Column 23, Line 39 and insert the following claim:
--4. The automated drywalling system of claim 1, wherein the sanding end effector further includes a powered active gimbal configured to set a tip-tilt angle of the sanding head, the powered active gimbal comprising:
a gimbal structure having a greater circumscribed diameter than a maximum diameter of the sanding head;
a first bar assembly coupled to the sanding head, the first bar assembly coupled to a gimbal ring via a plurality of first pivots;
a second bar assembly coupled to the gimbal ring via a plurality of second pivots;
a first set of spring-damper assemblies coupled between the first bar assembly and the gimbal structure; and
a second set of spring-damper assemblies coupled between the second bar assembly and the gimbal structure.--

Column 23, Line 46, cancel the text beginning with "6. An automated drywalling" to and ending "one sanding task." in Column 24, Line 23 and insert the following claim:

--6. An automated drywalling system comprising:

a base unit;

an elongated robotic arm that extends between a base end and a distal end, the robotic arm coupled to the base unit at the base end of the robotic arm;

a sanding end effector coupled at the distal end of the robotic arm, the sanding end effector configured to sand joint compound on a target surface and including an end effector actuator mechanism for at least one of tracking of surface contours of the target surface by the sanding end effector, applying a selected normal force to the target surface by a sanding head, and compensating for errors in positioning of the sanding end effector relative to the target surface via a stroke of the end effector actuator mechanism, the end effector actuator mechanism including a sensor for monitoring the stroke of the end effector actuator mechanism:

one or more vision systems; and a computing device executing a computational planner that:

obtains target surface data from the one or more vision systems, the target surface data including information regarding a configuration of a wall assembly including a plurality of drywall pieces disposed on the wall assembly forming one or more joints between respective drywall pieces having joint compound applied thereon;

automatically generates instructions for driving the sanding end effector, the robotic arm, and the base unit to perform at least one sanding task that includes the sanding end effector at least sanding the applied joint compound associated with the one or more joints between the respective drywall pieces, the generating based at least in part on the target surface data;

automatically drives the sanding end effector, the robotic arm, and the base unit to perform the at least one sanding task; and automatically updates at least one of tool paths and tool parameters of the sanding end effector based at least in part on a feedback mechanism, including the sensor for monitoring the stroke of the end effector actuator mechanism, to provide for a desired contact being maintained between the sanding end effector and the target surface during the at least one sanding task.--

Column 24, Line 24, cancel the text beginning with "7. The automated drywalling" to and ending "pieces of drywall." in Column 24, Line 30 and insert the following claim:

--7. The automated drywalling system of claim 6, wherein the generating instructions for driving the sanding end effector, the robotic arm, and the base unit to sand the joint compound of the one or more joints between the respective drywall pieces is further based on data obtained while the automated drywalling system was applying the joint compound to the one or more joints between respective drywall pieces.--

Column 24, Line 31, cancel the text beginning with "8. The automated drywalling" to and ending "respective drywall pieces." in Column 24, Line 37 and insert the following claim:

--8. The automated drywalling system of claim 6, wherein the sanding end effector further comprises a vacuum hood disposed around at least a portion of the sanding head to capture sanding debris generated by the sanding head sanding the joint compound of the one or more joints between the respective drywall pieces.--

CERTIFICATE OF CORRECTION (continued)
U.S. Pat. No. 10,718,119 B2

Column 24, Line 38, cancel the text beginning with "9. The automated drywalling" to and ending "of second pivots." in Column 24, Line 47 and insert the following claim:
--9. The automated drywalling system of claim 6, wherein the sanding end effector further includes a gimbal that comprises:
    a gimbal structure having a greater circumscribed diameter than a diameter of the sanding head;
    a first, bar assembly coupled to the sanding head, the first bar assembly coupled to a gimbal ring via a plurality of first pivots; and
    a second bar assembly coupled to the gimbal ring via a plurality of second pivots.--

Column 24, Line 63, cancel the text beginning with "13. The automated drywalling" to and ending "the target surface." in Column 24, Line 67 and insert the following claim:
--13. The automated drywalling system of claim 6, wherein the sanding end effector further includes a guiding element configured to engage the target surface or adjacent portion of the wall assembly to guide the sanding end effector in sanding the target surface.--

Column 25, Line 1, cancel the text beginning with "14. An automated sanding" to and ending "one sanding task." in Column 25, Line 31 and insert the following claim:
--14. An automated sanding system comprising:
    a positioning stage that extends between a base end and a distal end;
    a sanding end effector coupled at the distal end of the positioning stage, the sanding end effector configured to sand a target surface and including an end effector actuator mechanism for at least one of tracking of surface contours of the target surface by the sanding end effector, applying a desired normal force to the target surface by a sanding head, and compensating for errors in positioning of the sanding end effector relative to the target surface via a configuration of the end effector actuator mechanism, the end effector actuator mechanism including a sensor for monitoring the configuration of the end effector actuator mechanism; and
    a computing device executing a computational planner that:
        generates instructions for driving the sanding end effector and the positioning stage to perform at least one sanding task that at least includes the sanding end effector sanding the target surface, the generating based at least in part on obtained target surface data;
        drives the sanding end effector and a robotic arm to perform the at least one sanding task; and
        updates at least one of tool paths and tool parameters of the sanding end effector based at least in part on a feedback mechanism, including the sensor for monitoring the configuration of the end effector actuator mechanism, to provide for a desired contact being maintained between the sanding end effector and the target surface during the at least one sanding task.--

Column 26, Line 1, cancel the text beginning with "15. The automated sanding" to and ending "a robotic arm." in Column 26, Line 2 and insert the following claim:
--15. The automated sanding system of claim 14, wherein the positioning stage comprises the robotic arm.--

Column 26, Line 8, cancel the text beginning with "17. The automated sanding" to and ending "more second pivots." in Column 26, Line 16 and insert the following claim:

--17. The automated sanding system of claim 14, wherein the sanding end effector further includes a gimbal that comprises:
    a gimbal structure;
    a first bar assembly coupled to the sanding head, the first bar assembly coupled to a gimbal ring via one or more first pivots; and
    a second bar assembly coupled to the gimbal ring via one or more second pivots.--

Column 26, Line 17, cancel the text beginning with "18. The automated sanding" to and ending "the target surface." in Column 26, Line 22 and insert the following claim:
--18. The automated sanding system of claim 14, wherein the sanding end effector further includes a force limiting stage assembly that comprises one or more pneumatic springs configured to allow the sanding head to move relative to a distal end of the robotic arm to limit force applied to the target surface.--

Column 26, Line 27, cancel the text beginning with "20. The automated drywalling" to and ending "the target surface." in Column 27, Line 30 and insert the following claim:
--20. The automated sanding system of claim 14, wherein the sanding end effector further includes a guiding element configured to engage the target surface to guide the sanding end effector in sanding the target surface.--